United States Patent
Mircescu

(10) Patent No.: US 9,117,077 B2
(45) Date of Patent: Aug. 25, 2015

(54) SYSTEMS AND METHODS FOR USING A REPUTATION INDICATOR TO FACILITATE MALWARE SCANNING

(71) Applicant: Bitdefender IPR Management Ltd., Nicosia (CY)

(72) Inventor: Daniel Alexandru Mircescu, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 14/040,430

(22) Filed: Sep. 27, 2013

(65) Prior Publication Data
US 2015/0096018 A1   Apr. 2, 2015

(51) Int. Cl.
*G06F 11/30* (2006.01)
*G06F 21/56* (2013.01)

(52) U.S. Cl.
CPC ...................................... *G06F 21/56* (2013.01)

(58) Field of Classification Search
CPC ....................................................... G06F 11/30
USPC ............... 726/22–26; 713/187–188, 193–194
See application file for complete search history.

(56) References Cited

U.S. PATENT DOCUMENTS

| | | | |
|---|---|---|---|
| 6,931,540 B1 | 8/2005 | Edwards et al. | |
| 7,725,941 B1 | 5/2010 | Pavlyushchik | |
| 8,001,606 B1 | 8/2011 | Spertus | |
| 8,225,406 B1 * | 7/2012 | Nachenberg | 726/24 |
| 8,327,441 B2 | 12/2012 | Kumar et al. | |
| 8,495,705 B1 * | 7/2013 | Verma et al. | 726/2 |
| 2004/0083381 A1 * | 4/2004 | Sobel et al. | 713/200 |
| 2008/0235801 A1 * | 9/2008 | Soderberg et al. | 726/25 |
| 2011/0185429 A1 * | 7/2011 | Sallam | 726/24 |
| 2012/0023583 A1 | 1/2012 | Sallam | |
| 2013/0074186 A1 | 3/2013 | Muttik | |

* cited by examiner

*Primary Examiner* — Josnel Jeudy
(74) *Attorney, Agent, or Firm* — Law Office of Andrei D Popovici, PC

(57) ABSTRACT

Described systems and methods allow protecting a computer system from malware, such as viruses, Trojans, and spyware. A reputation manager executes in conjunction with an anti-malware engine. The reputation manager determines a reputation of a target process executing on the computer system according to a reputation of a set of executable modules, such as shared libraries, loaded by the target process. The anti-malware engine may be configured to employ a process-specific protocol to scan the target process for malware, the protocol selected according to process reputation. Processes trusted to be non-malicious may thus be scanned using a more relaxed protocol than unknown or untrusted processes. The reputation of executable modules may be static; an indicator of module reputation may be stored and/or retrieved by a remote reputation server. Process reputation may be dynamically changeable, i.e. re-computed repeatedly by the reputation manager in response to process life-cycle and/or security events.

29 Claims, 12 Drawing Sheets

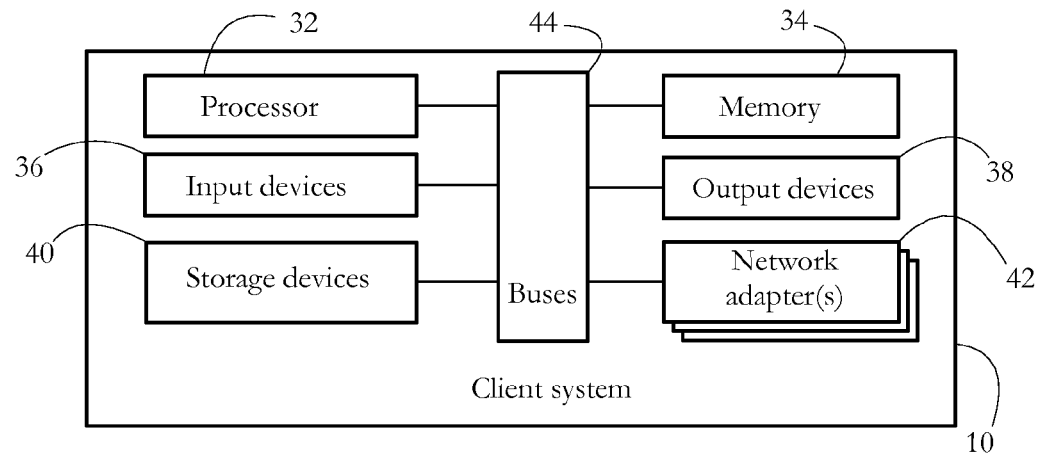
FIG. 3-A
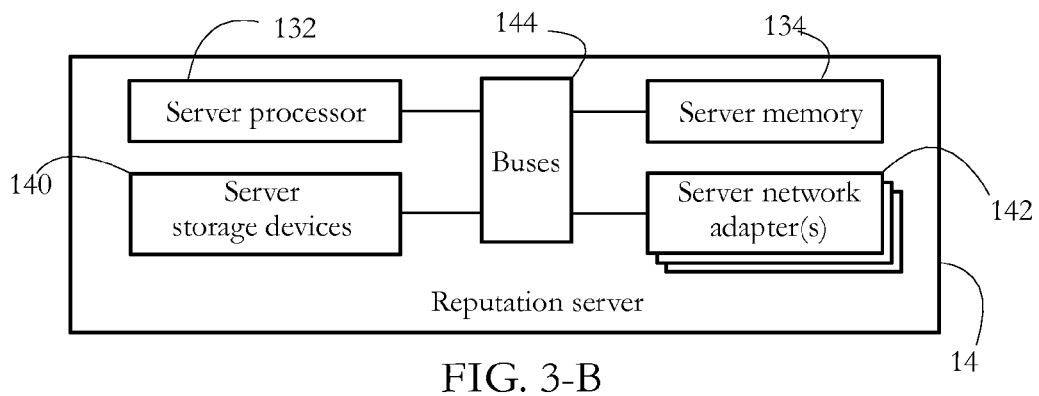
FIG. 3-B
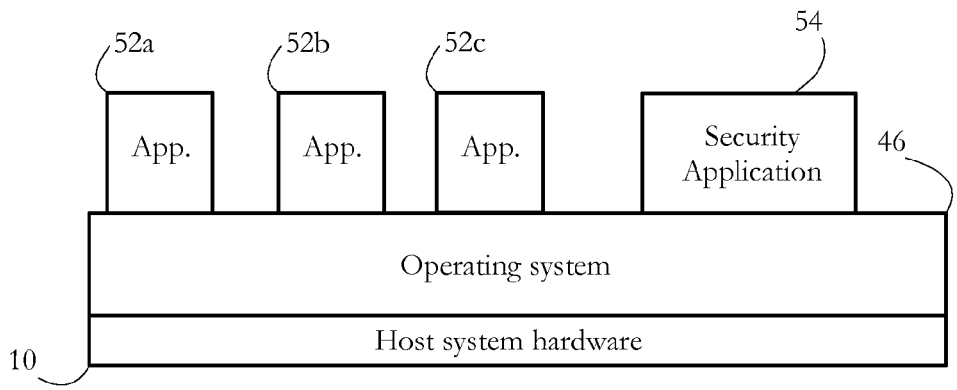
FIG. 4

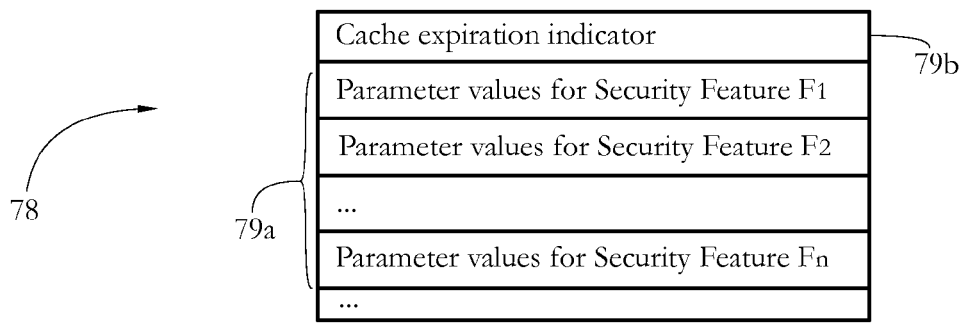
FIG. 10-A
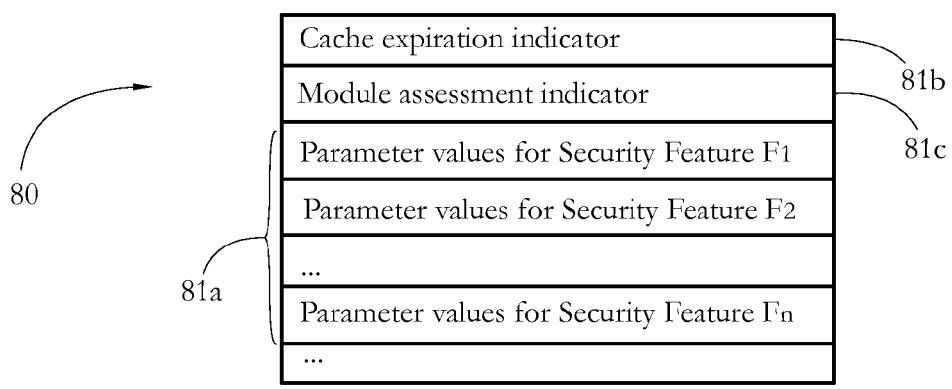
FIG. 10-B
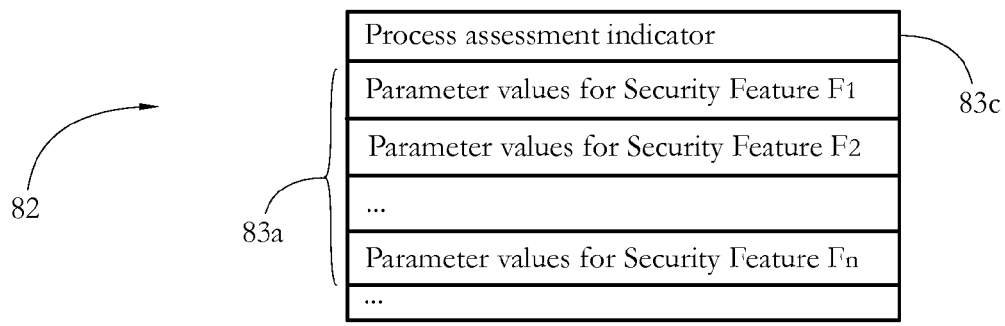
FIG. 10-C

SYSTEMS AND METHODS FOR USING A REPUTATION INDICATOR TO FACILITATE MALWARE SCANNING

BACKGROUND

The invention relates to systems and methods for protecting computer systems from malware.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others.

Security software may be used to detect malware infecting a user's computer system, and additionally to remove or stop the execution of such malware. Several malware-detection techniques are known in the art. Some rely on matching a fragment of code of the malware agent to a library of malware-indicative signatures. Other conventional methods detect a set of malware-indicative behaviors of the malware agent.

Security software may place a significant computational burden on a user's computer system. The proliferation of malware agents leads to a steady increase in the complexity of malware detection routines, signature databases, and behavior heuristics, which may further slow down anti-malware operations. To lower computational costs, security software may incorporate various optimization procedures, but each such procedure typically addresses a particular case or category of malware, and may not translate well to newly discovered malware.

To keep up with a rapidly changing set of threats, there is a strong interest in developing fast, robust and scalable anti-malware solutions.

SUMMARY

According to one aspect, a client system comprises at least one processor configured to execute a target process, the target process comprising an instance of a main executable module and an instance of a shared library, the at least one processor further configured to receive from a server a first module reputation indicator of the main executable module and a second module reputation indicator of the shared library, the first module reputation indicator determined according to a behavior of another instance of the main executable module. The server is configured to perform anti-malware transactions with a plurality of client systems including the client system. The at least one processor is further configured, in response to receiving the first and second module reputation indicators, to determine a process reputation indicator of the target process according to the first and second module reputation indicators, the process reputation indicator indicating whether or not the target process is likely to be malicious. The at least one processor is further configured, in response to determining the process reputation indicator of the target process, to configure an anti-malware scan according to the process reputation indicator, the anti-malware scan performed by the client system to determine whether the target process is malicious.

According to another aspect, a server comprises at least one processor configured to determine a first module reputation indicator of a main executable module and a second module reputation indicator of a shared library, the first module reputation indicator determined according to a behavior of an instance of the main executable module. The at least one processor is further configured, in response to determining the first and second module reputation indicators, to transmit the first and second module reputation indicators to a client system of a plurality of client systems configured to perform anti-malware transactions with the server. The client system is configured to execute a target process, the target process comprising another instance of the first shared library and an instance of the second shared library. The client system is further configured to determine a process reputation indicator of the target process according to the first and second module reputation indicators, the process reputation indicator indicating whether or not the target process is likely to be malicious. The client system is further configured, in response to determining the process reputation indicator, to configure an anti-malware scan according to the process reputation indicator, the anti-malware scan performed by the client system to determine whether the target process is malicious.

According to another aspect, a non-transitory computer readable medium stores instructions which, when executed, configure at least one processor of a client system executing a target process, the target process comprising an instance of a main executable module and an instance of a shared library, to receive from a server a first module reputation indicator of the main executable module and a second module reputation indicator of the shared library, the first module reputation indicator determined according to a behavior of another instance of the main executable module. The server is configured to perform anti-malware transactions with a plurality of client systems including the client system. The at least one processor is further configured, in response to receiving the first and second module reputation indicators, to determine a process reputation indicator of the target process according to the first and second module reputation indicators, the process reputation indicator indicating whether the target process is likely to be malicious. The at least one processor is further configured, in response to determining the process reputation indicator of the target process, to configure an anti-malware scan according to the process reputation indicator, the anti-malware scan performed by the client system to determine whether the target process is malicious.

According to another aspect, a client system comprises at least one processor configured to execute a target process, the target process comprising an instance of a first executable module and an instance of a second executable module. The at least one processor is further configured to receive from a server a first module reputation indicator of the first executable module and a second module reputation indicator of the second executable module, the first module reputation indicator determined according to a behavior of another instance of the first executable module. The server is configured to perform anti-malware transactions with a plurality of client systems including the client system. The at least one processor is further configured, in response to receiving the first and second module reputation indicators, to determine a process reputation indicator of the target process according to the first and second module reputation indicators, the process reputation indicator indicating whether or not the target process is likely to be malicious. The at least one processor is further configured, in response to determining the process reputation indicator of the target process, to configure an anti-malware scan according to the process reputation indicator, the anti-malware scan performed by the client system to determine whether the target process is malicious.

According to another aspect, a server comprises at least one processor configured to perform anti-malware transactions with a plurality of client systems, the plurality of client systems including a client system. The client system is configured to execute a target process, the target process comprising an instance of a first executable module and an instance of a second executable module. The at least one processor is further configured to determine a first module reputation indicator of the first executable module and a second module reputation indicator of the second executable module, the first module reputation indicator determined according to a behavior of another instance of the first executable module; and in response to determining the first and second module reputation indicators, to transmit the first and second module reputation indicators to the client system. The client system is further configured to determine a process reputation indicator of the target process according to the first and second module reputation indicators, the process reputation indicator indicating whether or not the target process is likely to be malicious. The client system is further configured, in response to determining the process reputation indicator, to configure an anti-malware scan according to the process reputation indicator, the anti-malware scan performed by the client system to determine whether the target process is malicious.

BRIEF DESCRIPTION OF THE DRAWINGS

The foregoing aspects and advantages of the present invention will become better understood upon reading the following detailed description and upon reference to the drawings where:

FIG. 3-A illustrates an exemplary hardware configuration of a client system according to some embodiments of the present invention.

FIG. 3-B shows an exemplary hardware configuration of a reputation server according to some embodiments of the present invention.

FIG. 4 shows an exemplary set of software objects, including a security application protecting a client system from malware according to some embodiments of the present invention.

FIG. 9 further shows a process reputation indicator determined for each process, and a module reputation indicator determined for each executable module, according to some embodiments of the present invention.

FIG. 10-A illustrates an exemplary cloud reputation indicator according to some embodiments of the present invention.

FIG. 10-B shows an exemplary module reputation indicator according to some embodiments of the present invention.

FIG. 10-C shows an exemplary process reputation indicator according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a process represents an instance of a computer program, wherein a computer program is a sequence of instructions determining a computer system to perform a specified task. Unless otherwise specified, a hash is an output of a hash function. Unless otherwise specified, a hash function is a mathematical transformation mapping a variable-length sequence of symbols (e.g. characters, bits) to fixed-length data such as a number or bit string. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
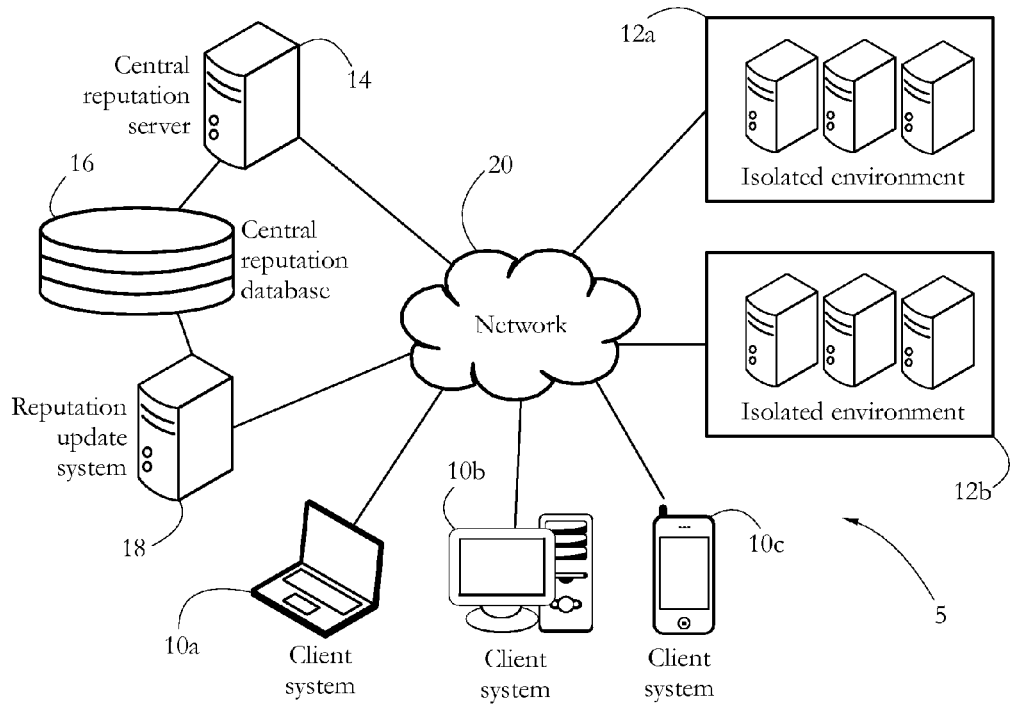
FIG. 1 shows an exemplary anti-malware system comprising a plurality of client systems and a reputation server, according to some embodiments of the present invention.

FIG. 1 shows an exemplary anti-malware system 5 according to some embodiments of the present invention. System 5 comprises a set of client systems 10a-c and a central reputation server 14, connected via a communication network 20. Central reputation server may further be connected to a central reputation database 16 and to a reputation update system 18. In some embodiments, system 5 may further comprise a set of isolated environments 12a-b (for instance, corporate Intranets) connected to network 20. Network 20 may be a wide-area network such as the Internet, while parts of network 20 may also include a local area network (LAN).

Client systems 10a-c may include end-user computers, each having a processor, memory, and storage, and running an operating system such as Windows®, MacOS® or Linux. Some client computer systems 10a-c may be mobile computing and/or telecommunication devices such as tablet PCs, mobile telephones, personal digital assistants (PDA), wearable computing devices, household devices such as TVs or music players, or any other electronic device including a processor and a memory unit, and requiring malware protection. In some embodiments, client systems 10a-c may represent individual customers, or several client systems may belong to the same customer.

In some embodiments, central reputation server 14 is configured to handle reputation data at the request of client systems 10a-c. Reputation database 16 may comprise a repository of reputation data, such as module reputation indicators determined for a plurality of executable modules, as described in detail below. In an exemplary embodiment, server 14 may retrieve reputation data, on demand, from central reputation database 16, and may transmit such reputation data to client systems 10a-c. In some embodiments, reputation update system 18 is configured to save and/or update reputation data to reputation database 16, as described further below.

Figure 2:
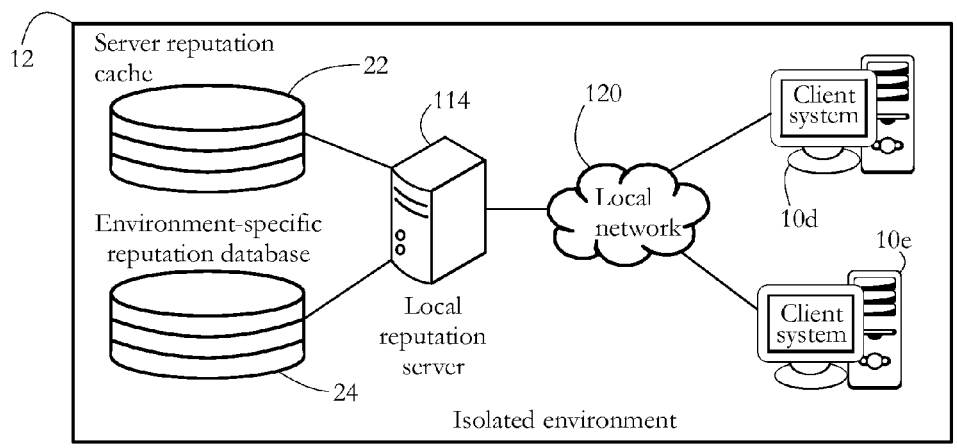
FIG. 2 shows an exemplary isolated environment, such as a corporate Intranet, protected from malware according to some embodiments of the present invention.

FIG. 2 illustrates an isolated environment 12, such as a corporate Intranet, connected to network 20. Environment 12 comprises a set of client systems 10d-e and a local reputation server 114, all connected to a local network 120. Network 120 may represent, for instance, a local area network. In some embodiments, isolated environment 12 may further comprise a server reputation cache 22 and an environment-specific reputation database 24, connected to local network 120. Local reputation server 114 may be configured to handle reputation data at the request of client systems 10d-e, for instance to retrieve reputation data from reputation cache 22 and/or environment-specific reputation database 24, and to transmit such data to the requesting client systems 10d-e. Cache 22 and database 24 may be configured to store reputation data, such as module reputation indicators, as shown below. In some embodiments, local reputation server 114 may be further configured to communicate with central reputation server 14, for instance to retrieve reputation data from server 14 and to store such data into cache 22 and/or local reputation database 114.

FIG. 3-A shows an exemplary hardware configuration of a client system 10, such as client systems 10a-e of FIGS. 1-2, performing anti-malware operations according to some embodiments of the present invention. Client system 10 may represent a corporate computing device such as an enterprise server, or an end-user device such as a personal computer or a smartphone, among others. FIG. 3 shows a computer system for illustrative purposes; other client systems such as mobile telephones or tablets may have a different configuration. In some embodiments, system 10 comprises a set of physical devices, including a processor 32, a memory unit 34, a set of input devices 36, a set of output devices 38, a set of storage devices 40, and a set of network adapters 42, all connected by a set of buses 44.

In some embodiments, processor 32 comprises a physical device (e.g. multi-core integrated circuit) configured to execute computational and/or logical operations with a set of signals and/or data. In some embodiments, such logical operations are delivered to processor 32 in the form of a sequence of processor instructions (e.g. machine code or other type of software). Memory unit 34 may comprise non-transitory computer-readable media (e.g. RAM) storing data/signals accessed or generated by processor 32 in the course of carrying out instructions.

Input devices 36 may include computer keyboards, mice, and microphones, among others, including the respective hardware interfaces and/or adapters allowing a user to introduce data and/or instructions into client system 10. Output devices 38 may include display screens and speakers among others, as well as hardware interfaces/adapters such as graphic cards, allowing system 10 to communicate data to a user. In some embodiments, input devices 36 and output devices 38 may share a common piece of hardware, as in the case of touch-screen devices. Storage devices 40 include computer-readable media enabling the non-transitory storage, reading, and writing of software instructions and/or data. Exemplary storage devices 40 include magnetic and optical disks and flash memory devices, as well as removable media such as CD and/or DVD disks and drives. The set of network adapters 42 enables client system 10 to connect to a computer network, e.g., networks 20, 120, and/or to other devices/computer systems. Buses 44 collectively represent the plurality of system, peripheral, and chipset buses, and/or all other circuitry enabling the inter-communication of devices 32-42 of client system 10. For example, buses 44 may comprise the northbridge connecting processor 32 to memory 34, and/or the southbridge connecting processor 32 to devices 36-42, among others.

FIG. 3-B shows an exemplary hardware configuration of a reputation server, such as central reputation server 14 in FIG. 1, or local reputation server 114 in FIG. 2. Server 14 comprises a server processor 132, a server memory 134, a set of server storage devices 140, and a set of network adapters 142, all connected by a set of buses 144. The operation of devices 132, 134, 140, and 142 may mirror that of devices 32, 34, 40, and 42 described above. For instance, server processor 132 may comprise a physical device configured to execute computational and/or logical operations with a set of signals and/or or data. Server memory 134 may comprise non-transitory computer-readable media (e.g. RAM) storing data/signals accessed or generated by processor 132 in the course of executing computations. Network adapters 142 enable server 14 to connect to a computer network such as networks 20, 120.

FIG. 4 shows an exemplary set of software objects executing on client system 10, according to some embodiments of the present invention. A guest operating system (OS) 46 comprises software that provides an interface to the hardware of client system 10, and acts as a host for a set of software applications 52a-c and 54. OS 46 may comprise any widely available operating system such as Windows®, MacOS®, Linux®, iOS®, or Android™, among others. Applications 52a-c may include word processing, image processing, database, browser, and electronic communication applications, among others. In some embodiments, a security application 54 is configured to perform anti-malware operations as detailed below, to protect client system 10 from malware. Security application 54 may be a standalone program, or may form part of a software suite comprising, among others, anti-malware, anti-spam, and anti-spyware components.

Figure 5:
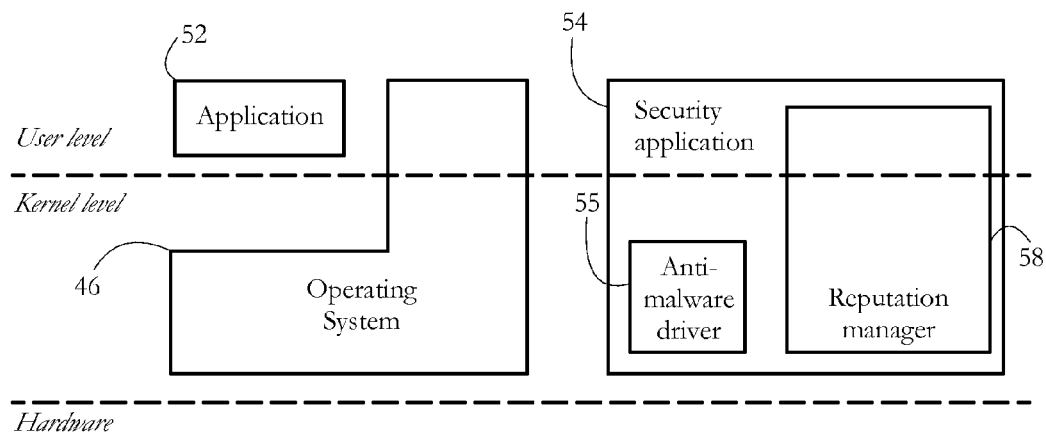
FIG. 5 shows an exemplary set of software objects executing on a client system according to some embodiments of the present invention. The objects are represented from the perspective of processor privilege levels.

FIG. 5 illustrates a set of software objects executing on client system 10, represented from the perspective of processor privilege levels, also known in the art as layers or protection rings. In some embodiments, each such layer or protection ring is characterized by a set of instructions, which a software object executing at the respective processor privilege level is allowed to execute. When a software object attempts to execute an instruction, which is not allowed within the respective privilege level, the attempt may trigger a processor event, such as an exception or a fault. Most components of operating system 46 execute at a processor privilege level known in the art as kernel level, or kernel mode (e.g., ring 0 on Intel platforms). An application 52 executes at lesser processor privilege than OS 46 (e.g., ring 3, or user mode).

In some embodiments, parts of security application 54 may execute at user-level processor privilege, i.e., same level as application 52. For instance, such parts may comprise a graphical user interface informing a user of any malware or security threats detected on the respective VM, and receiving input from the user indicating, e.g., a desired configuration option for application 54. Other parts of application 54 may execute at kernel privilege level. For instance, application 54 may install an anti-malware driver 55, providing kernel-level functionality to anti-malware application 54, e.g. to scan memory for malware signatures and/or to detect malware-indicative behavior of processes and/or other software objects executing on OS 46. In some embodiments, security application 54 further comprise a reputation manager 58, parts of which may execute in kernel mode.

Figure 6:
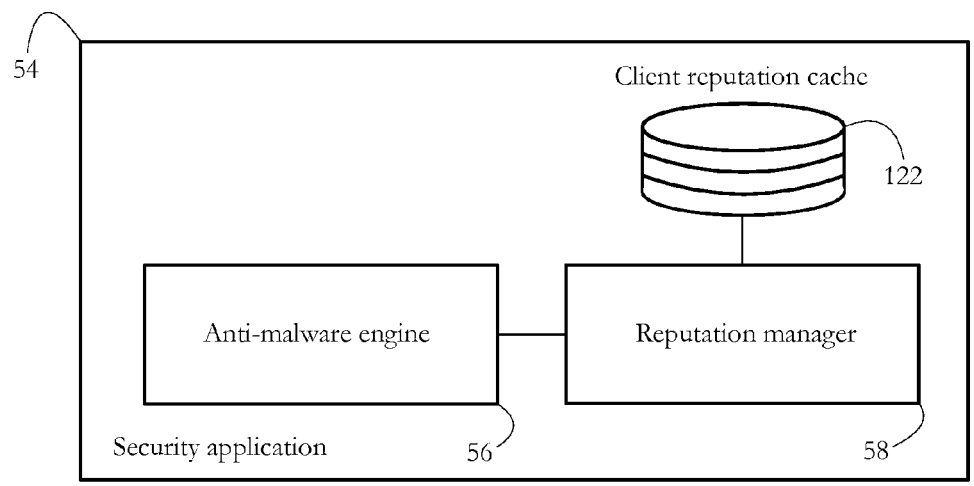
FIG. 6 shows a diagram of an exemplary security application comprising a reputation manager and an anti-malware engine, according to some embodiments of the present invention.

FIG. 6 shows a diagram of an exemplary security application 54 according to some embodiments of the present invention. Application 54 comprises an anti-malware engine 56 and a client reputation cache 122, both connected to reputation manager 58. In some embodiments, client reputation cache 122 is configured to temporarily store reputation data, such as module reputation indicators, and to transmit such data to reputation manager 58. In some embodiments, reputation manager 58 is configured to determine reputation data determined for a variety of software objects including applications, processes, and executable modules, to store and/or retrieve such data from cache 122, and to transmit such data to anti-malware engine 56.

In some embodiments, engine 56 is configured to scan software objects executing on client system 10, such as applications 52a-c in FIG. 4, for malware. Such malware scanning may include determining whether a target software object contains malicious code, and further removing the respective code or preventing the respective code from executing. In some embodiments, a piece of code is considered malicious if it is configured to perform any of a set of malicious actions. Such malicious actions may include any action conducive to a loss of privacy, a loss of personal or sensitive data, or a loss of productivity on the part of a user. Some examples include modifying or erasing data without the knowledge or authorization of a user, and altering the execution of legitimate programs executing on client system 10. Other examples of malicious actions include extracting a user's personal or sensitive data, such as passwords, login details, credit card or bank account data, or confidential documents, among others. Other examples of malicious actions include an unauthorized interception or otherwise eavesdropping on a user's conversations and/or data exchanges with third parties. Other examples include employing client system 10 to send unsolicited communication (spam), and employing client system 10 to send malicious data requests to a remote computer system, as in a denial-of-service attack.

In some embodiments, target objects scanned by engine 56 comprise user-mode applications, processes, and executable modules. Unless otherwise specified, a process is an instance of a computer program, such as an application or a part of operating system 46, and is characterized by having at least an execution thread and a section of virtual memory assigned to it by the operating system, the respective memory section comprising executable code. Unless otherwise specified, an executable module is a component or a building block of a process; each such module comprises executable code. Exemplary executable modules include a main executable of a process (such as an EXE file in Windows®), and a shared library (such as a dynamic-linked library—DLL), among others. In some embodiments, the main executable module of a process comprises the first machine instruction executed when the respective process is launched. Libraries are self-contained sections of code implementing various functional aspects of a program. Shared libraries may be used independently by more than one program. Similar kinds of executable modules may be identified in client systems 10 executing operating systems such as Linux®, or MacOS®. Executable modules may be loaded and/or unloaded to/from memory during the launch and/or execution of the respective process. To perform malware scanning, engine 56 may employ any anti-malware method known in the art, such as signature matching and behavioral scanning, among others.

In some embodiments, reputation manager 58 cooperates with anti-malware engine 56 to facilitate malware detection. For instance, reputation manager 58 may communicate an indicator of a reputation of a certain software object, such as a process or an executable module, to anti-malware engine 56. In some embodiments, the reputation of the software object indicates a level of trust that the respective object is not malicious. For example, the reputation indicator may indicate that the respective object is trusted, untrusted, or unknown. In response, anti-malware engine 56 may give preferential treatment to trusted objects. For instance, engine 56 may use a relaxed security protocol to scan a trusted object, and a strict security protocol to scan an unknown or an untrusted object, wherein the relaxed security protocol is less computationally expensive than the strict security protocol. In one such example, a relaxed security protocol may instruct engine 56 to employ only a subset of malware detection methods and/or only a subset of malware-identifying heuristics to scan a trusted object, whereas a strict security protocol may use a full set of methods and/or heuristics available to engine 56. In some embodiments, the relaxed security protocol may be specifically tailored to each process or executable module, as shown in detail below. For instance, reputation manager 58 may configure engine 56 to use a process-specific protocol by transmitting a process-specific set of scan parameter values to engine 56, the scan parameter values used to instantiate a set of configuration parameters of engine 56 when scanning/monitoring the respective process. Thus, the scanning/monitoring protocol may differ between a trusted and an untrusted object, but also between one trusted object and another trusted object.

In some embodiments, the reputation of a target software object may be determined according to the reputation of a set of building blocks of the respective object. The reputation of the building blocks may be stored in a local repository (e.g., caches 22, 122) and/or a remote repository (e.g., central reputation database 16), and reused for every occurrence of the respective building blocks. In contrast, the reputation of the target object itself may be determined dynamically, i.e. computed repeatedly by reputation manager 58 in response to security events and/or to certain life-cycle events of the target object. Such an approach defines a preferred scale/granularity of the stored reputation data. The size and type of building blocks may vary from one embodiment to another. In some embodiments, building blocks are executable modules (e.g., main executables and shared libraries); for simplicity, the following discussion will only describe such implementations. Other examples of building blocks include executable scripts called by the respective process (e.g., Perl, Visual Basic, and Python scripts), and interpreted files (e.g. Java® JAR files), among others. A person skilled in the art will appreciate that the systems and methods described here may be translated to other kinds of building blocks and other levels of granularity.

Figure 7:
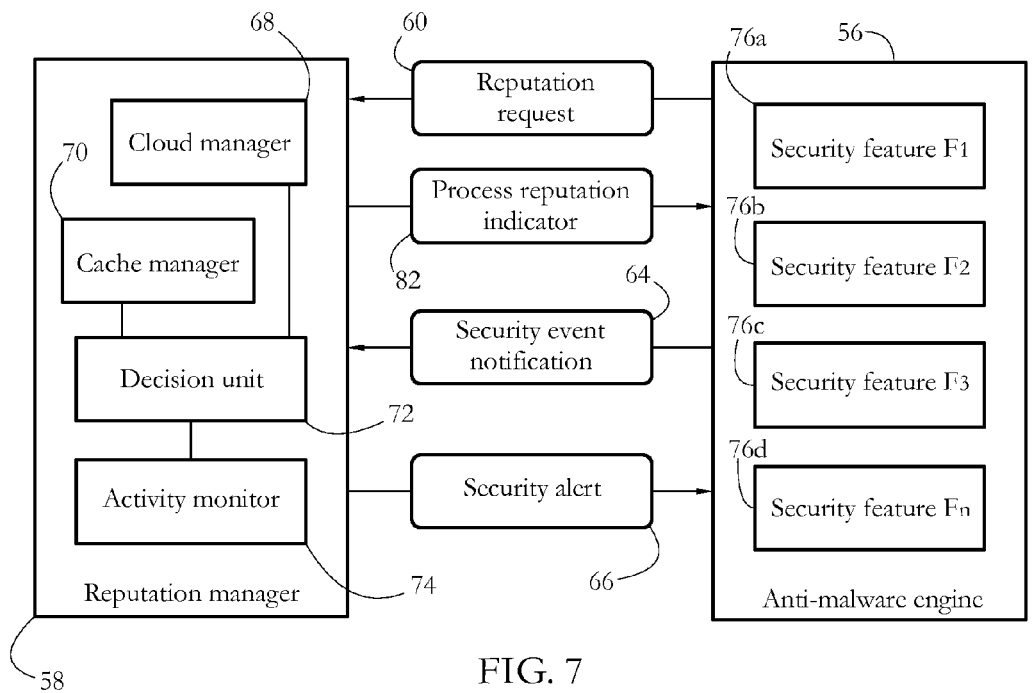
FIG. 7 shows exemplary data exchanges between the reputation manager and the anti-malware engine of FIG. 6, according to some embodiments of the present invention.

FIG. 7 shows further details of reputation manager 58 and anti-malware engine 56, and exemplary data exchanges between components 56 and 58 in some embodiments of the present invention. Anti-malware engine 56 may comprise a plurality of security features 76a-d. In some embodiments, features 76a-d are components of engine 56, which may execute independently of each other. Exemplary security features include individual anti-malware components, each implementing a distinct method: a firewall, a behavioral scanner, and a signature matching engine, among others. In some embodiments, a firewall intercepts inbound and/or outbound network traffic related to software objects executing on client system 10 and may accept, deny or modify the passage or content of such traffic according to user-indicated rules and/or internal heuristics. In some embodiments, a behavioral scanner monitors the behavior (e.g., detects actions, such as writing to a disk file or editing an OS registry key) of software objects executing on client system 10. A signature-matching engine may attempt to match a sequence of code of a software object executing on client system 10 against a list of malware-indicative sequences of code known as signatures; a match may indicate that the respective object comprises malware. Another exemplary security feature is a security procedure, possibly combining a plurality of anti-malware methods/components, for instance "apply method A; if outcome 1, apply method B; etc.". Other examples of security procedures include on-demand and on-access scanning Yet another exemplary security feature is a set of malware-identifying heuristics.

In some embodiments, security features 76a-d may be configured using a set of scan parameters; changing a value of a scan parameter may alter the operation of the respective feature. One exemplary scan parameter is a threshold used for comparing against a malware-indicative score; when the score exceeds the respective threshold value, a process/module may be considered malicious. Another example of a scan parameter is a set of heuristics used by a behavior scanner to decide whether a process/module is malicious. Another example of scan parameter is a set of neuronal weights used to calibrate a neural network classifier to distinguish between benign and malicious objects. In some embodiments, reputation manager 58 may effectively configure the operation of anti-malware engine 56 by transmitting a set of values of such scan parameters to engine 56, as shown in detail below.

In some embodiments, reputation manager 58 (FIG. 7) includes a decision unit 72, an activity monitor 74 connected to decision unit 72, a cloud manager 68, and a cache manager 70 both connected to decision unit 72. Reputation manager 58 may be configured to receive a reputation request 60 and/or a security event notification 64 from anti-malware engine 56, and to transmit a process reputation indicator 82 and/or a security alert 66 to anti-malware engine 56. Details of such data exchanges are given below.

In some embodiments, activity monitor 74 is configured to detect life-cycle events of software objects, such as applications and processes, executing within client system 10, to maintain a list of such monitored objects, and to communicate such events to decision module 72. Monitor 74 may detect, for instance, the launch and/or termination of applications, processes and/or threads. Other exemplary events intercepted by monitor 74 include a process loading and/or unloading an executable module, such as a DLL, into/from its memory space. Activity monitor 74 may further determine inter-object relationships, such as which process loaded which executable module. Other such relationships include filiation, e.g., parent-child relationships. In some embodiments, monitor 74 may further determine whether a selected object has injected code into another object, or whether the selected object is the target of such injection by another software object. A child object is an executable entity created by another object called the parent object, the child object executing independently from the parent object. Exemplary child objects are child processes, for instance created via the CreateProcess function of the Windows® OS, or via the fork mechanism in Linux®. Code injection is a generic term used in the art to indicate a family of methods of introducing a sequence of code, such as a dynamic-link library (DLL), into the memory space of an existing process, to alter the original functionality of the respective process. To perform tasks such as detecting the launch of a process and/or detecting code injection, monitor 74 may employ any method known in the art, such as calling or hooking certain OS functions. For instance, in a system running a Windows® OS, monitor 74 may intercept a call to a LoadLibrary function or to a CreateFileMapping function to detect the loading of an executable module. In another example, monitor 74 may register a PsSetCreateProcessNotifyRoutine callback to detect the launch of a new process, and/or may hook the CreateRemoteThread function to detect execution of injected code.

In some embodiments, decision unit 72 is configured to receive data from activity monitor 74, indicating the occurrence of a life-cycle event of a target process, for instance, the launch of the target process. Decision unit 72 may be further configured to request data indicative of the reputation of an executable module of the target process (e.g., the main executable or a shared library loaded by the target process), from cache manager 70 and/or cloud manager 68. Unit 72 may be further configured to determine a reputation of the target process according to the reputation of the respective executable module, and to transmit indicator 82 indicative of the reputation of the target process to anti-malware engine 56.

In some embodiments, decision unit 72 may be configured to receive security event notification 64 from anti-malware engine 56, notification 64 indicative of a security event triggered by the execution, or occurring during the execution of a target process or module. Such security events are detected by anti-malware engine 56; some examples include the target process/module performing a certain action, such as downloading a file from the Internet, or modifying a registry key of OS 46. Such actions performed by the target process/module may be malware-indicative themselves, or may be malware-indicative when occurring in conjunction with other actions performed by the target process/module or by processes related to the target process (e.g., by a child process of the target process). Decision unit 72 may be further configured to, in response to receiving notification 64, (re)compute process reputation indicator 82 of the respective target process according to notification 64, and transmit indicator 82 to anti-malware engine 56.

In some embodiments, decision unit 72 may be configured to analyze notification 64, and for certain types of security events indicated by notification 64, to send security alert 66 to anti-malware engine 56. Security alert 66 may indicate to anti-malware engine 56 that the respective client system 10 is suspected of malware infection, and may configure engine 56 to execute a strict security protocol, which will be referred to as paranoid mode. A more detailed description of the operation of decision unit 72 is given below.

Figure 8:
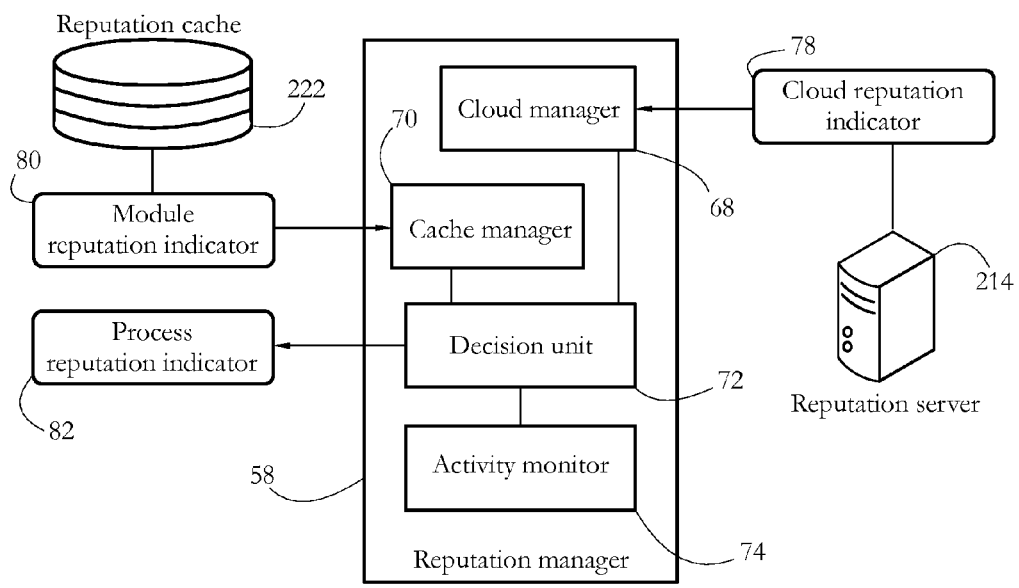
FIG. 8 illustrates an exemplary reputation manager receiving data from a reputation cache and a reputation server, according to some embodiments of the present invention.

Cache manager 70 and cloud manager 68 may be configured to retrieve reputation data from a reputation cache 222 and a reputation server 214, respectively, at the request of decision module 72. Cache 222 may represent, for instance, client reputation cache 122 (FIG. 6). Reputation server 214 may represent central reputation server 14 (FIG. 1) or local reputation server 114 (FIG. 2), depending on implementation. FIG. 8 illustrates cache manager 70 receiving a module reputation indicator 80 from cache 222, and cloud manager 68 receiving a cloud reputation indicator 78 from reputation server 214, according to some embodiments of the present invention. Cache manager 70 may be further configured to store reputation data received by cloud manager 68 in cache 222 for a variable, but limited amount of time; cache lifetime of reputation data may be determined according to cloud indicator 78.

Figure 9:
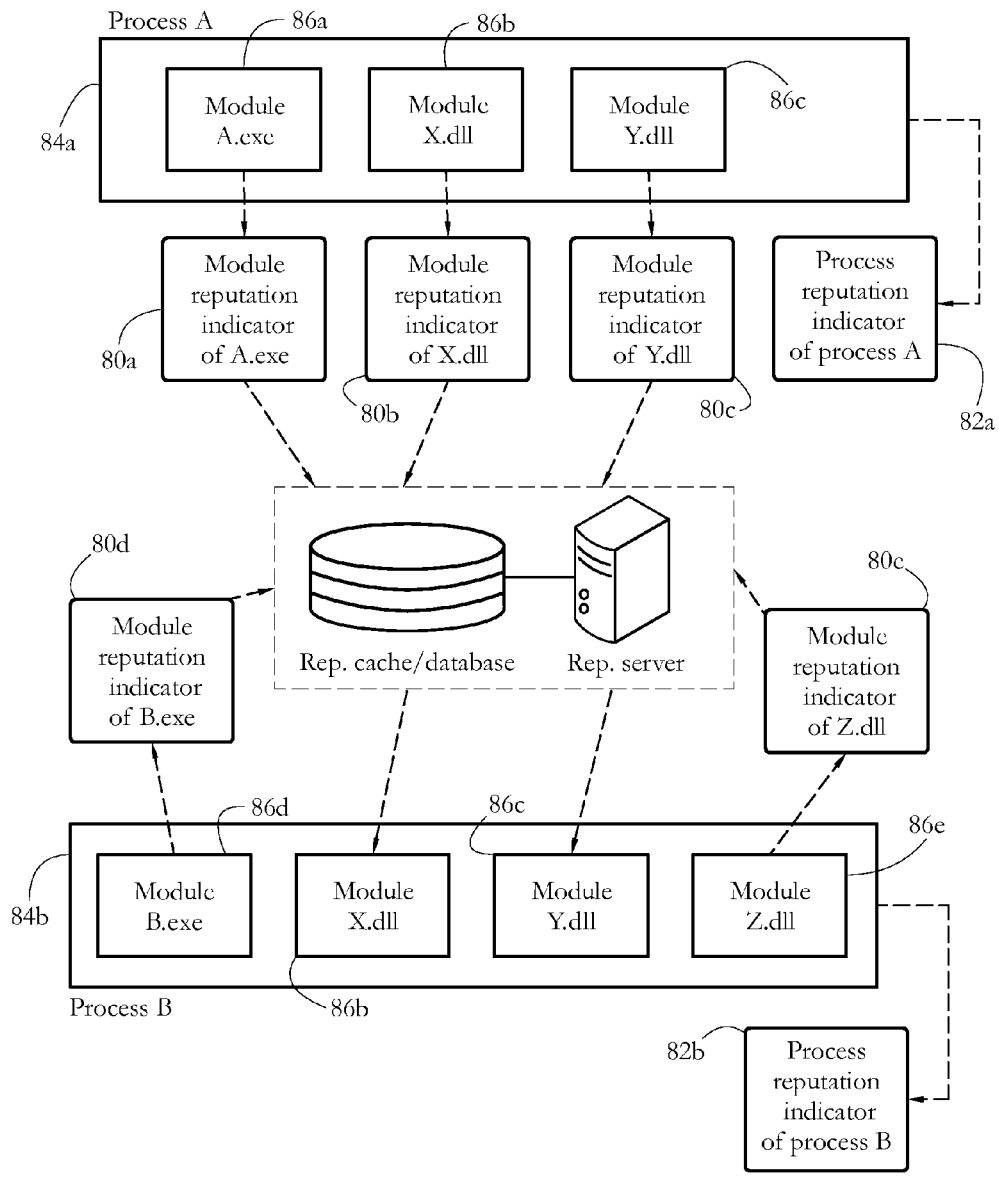
FIG. 9 shows two processes executing on a client system, each process comprising a plurality of executable modules.

FIG. 9 shows two exemplary processes 84*a-b* and a plurality of reputation indicators according to some embodiments of the present invention. Process 84*a* comprises executable modules 86*a-c*, e.g., a main executable 86*a*, and two dynamic-linked libraries 86*b-c*. Process 84*b* includes a main executable 86*d*, and three DLLs, two of which being instances of libraries 86*b-c* of process 84*a*. A set of module reputation indicators 80*a-e* is determined for modules 86*a-e*, respectively, and a set of process reputation indicators 82*a-b* is determined for processes 84*a-b*, respectively.

In some embodiments, module reputation indicators 80*a-e* are static data items, stored to and/or retrieved from reputation cache 222 and/or reputation server 214 (FIG. 8). When two or more processes load instances of the same module, e.g. a shared library as in FIG. 9, module reputation indicators of all such instances may be identical. Process reputation indicator 82*a* is determined according to module reputation indicators 86*a-c*, while process indicator 82*b* is determined according to module reputation indicators 86*b-e*. In contrast to module reputation indicators, process reputation indicators 82*a-b* may be dynamically-changeable, re-computed repeatedly by reputation manager 58 in response to security events occurring in client system 10, and/or in response or life-cycle events of processes 84*a-b*, respectively.

Some exemplary formats of cloud, module, and process reputation indicators are illustrated in FIGS. 10-A-C, respectively. Cloud reputation indicator 78 comprises a set of cloud scan parameter values 79*a*, and a cache expiration indicator 79*b*, among others. Cache expiration indicator 79*b* indicates a lifetime of the cloud reputation indicator 78, i.e., the length of time during which the respective reputation data should be stored in cache 222. Such lifetimes may vary among executable modules. By specifying a limited lifetime for cache reputation data, some embodiments effectively force a refresh of such data from reputation server 214, therefore containing the spread of a potential infection of the respective module.

In some embodiments, cloud scan parameter values 79*a* comprise sets of parameter values to be used to configure security features 76*a-d* of anti-malware engine 56 (FIG. 7) when scanning/monitoring the respective executable module. In one such example, security feature $F_1$ is a behavioral scanner, and scan parameter values for $F_1$ include a tuple $\{v_1, v_3, \ldots\}$, wherein parameter value $v_1$ indicates "activate behavioral scan technology X", and parameter value $v_3$ indicates "disable heuristic set Y", etc. When monitoring the respective executable module, this exemplary behavioral scanner feature of engine 56 is instructed to use technology X, while disabling heuristic set Y.

Some embodiments of module reputation indicator 80 (FIG. 10-B) include a set of module scan parameter values 81*a*, a cache expiration indicator 81*b*, and a module assessment indicator 81*c*, among others. Module scan parameter values 81*a* indicate values of parameters configuring anti-malware engine 56 to monitor and/or scan the respective module. Cache expiration indicator 81*b* indicates a lifetime of the respective reputation data. In some embodiments, cache expiration indicator 81*b* is identical to cache expiration indicator 79*b* of the respective module. Module scan parameter values 81*a* may be identical to cloud scan parameter values 79*a* of the respective module, or may differ from parameter values 79*a* following a security event, such as the respective module performing a malware-indicative action (see below).

Module assessment indicator 81*c* provides an estimation of the level of trust currently given to the respective module. In some embodiments, module assessment indicator 81*c* labels the respective module as trusted, untrusted, or unknown, according to current information. A label of trusted may indicate that the respective module is not likely to be malicious. A label of untrusted may indicate that the respective module is suspected of malice (for instance, when the respective module has performed a malware-indicative action, such as injecting code into another module or process). A label of unknown may indicate that cache 222 and/or server 214 hold no reputation data of the respective module.

In some embodiments, process reputation indicator 82 (FIG. 10-C) includes a set of process scan parameter values 83*a*, and a process assessment indicator 83*c*, among others. Process assessment indicator 83*c* is indicative of a level of trust currently given to the respective process. Exemplary values of indicator 83*c* include positive, negative, and neutral. A positive label may indicate that the respective process is not likely to be malicious, and may instruct anti-malware engine 56 to scan and/or monitor the respective process using scan parameter values 83*a*. A negative label may indicate a suspicion of malice, instructing malware engine 56 to analyze the respective process using a predetermined strict security protocol. A neutral label may indicate that the respective process is neither completely trusted, nor malicious, and may instruct engine 56 to analyze the respective process using a predetermined default security protocol. In some embodiments, when a target process comprises a set of executable modules, indicators 83*a* of the target process are determined according to indicators 81*a* of each of the set of executable modules of the target process, as described below. Moreover, process assessment indicator 83*c* of the target process may be determined according to module assessment indicators 81*c* of the set of executable modules of the target process, as shown below.

Figure 11:
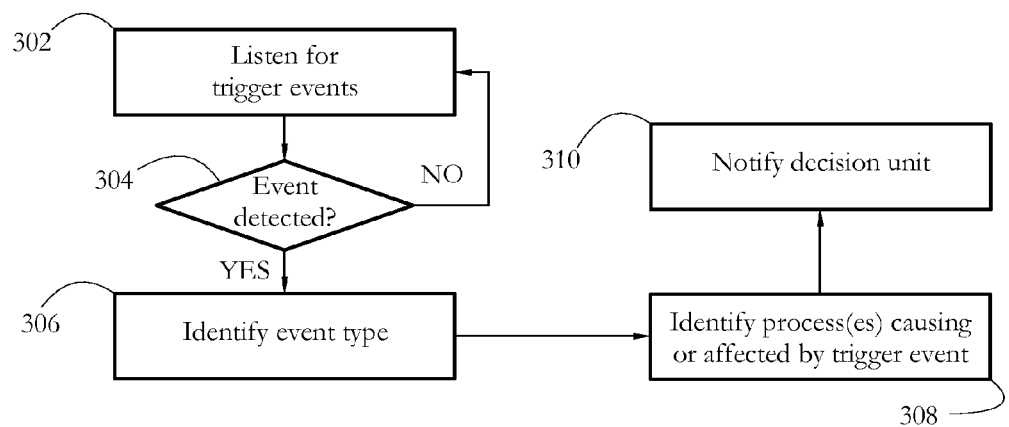
FIG. 11 shows an exemplary sequence of steps performed by the activity monitor of FIGS. 7-8 according to some embodiments of the present invention.

FIG. 11 shows an exemplary sequence of steps carried out by activity monitor 74 (FIG. 7) according to some embodiments of the present invention. In a sequence of steps 302-304, monitor 74 waits for the occurrence of a trigger event within client system 10. Exemplary trigger events include life-cycle events of processes executing on client system 10, such as the launch or termination of a process. Other examples include a process loading or unloading an executable module such as a DLL. Yet another exemplary trigger event is a parent process spawning a set of child processes. To detect the occurrence of such trigger events, activity monitor 74 may use any method known in the art, such as calling or hooking certain OS functions, e.g., a function used by OS 46 to launch a process into execution.

In a step 306, activity monitor 74 may identify the type of event, for instance the launch of a new process into execution. When a trigger event has indeed occurred, a step 308 may identify the process(es) either causing the respective trigger event, or being affected by the trigger event. In some embodiments, monitor 74 may determine the identity of such processes from data structures used by OS 46 to represent each process currently in execution. For instance, in Windows, each process is represented as an executive process block (EPROCESS), which comprises, among others, handles to each of the threads of the respective process, and a unique process ID allowing OS 46 to identify the respective process from a plurality of executing processes. Similar process representations are available for other OSs, such as Linux®. When more than one process are affected by the trigger event, step 308 may further include determining a relationship between the respective processes. For instance, when a parent process launches a child process, monitor 74 may record the identity of child and parent, and the type of their relationship (filiation). Next, in a step 310, activity monitor 74 may transmit a notification regarding the trigger event to decision unit 72.

Figure 12:
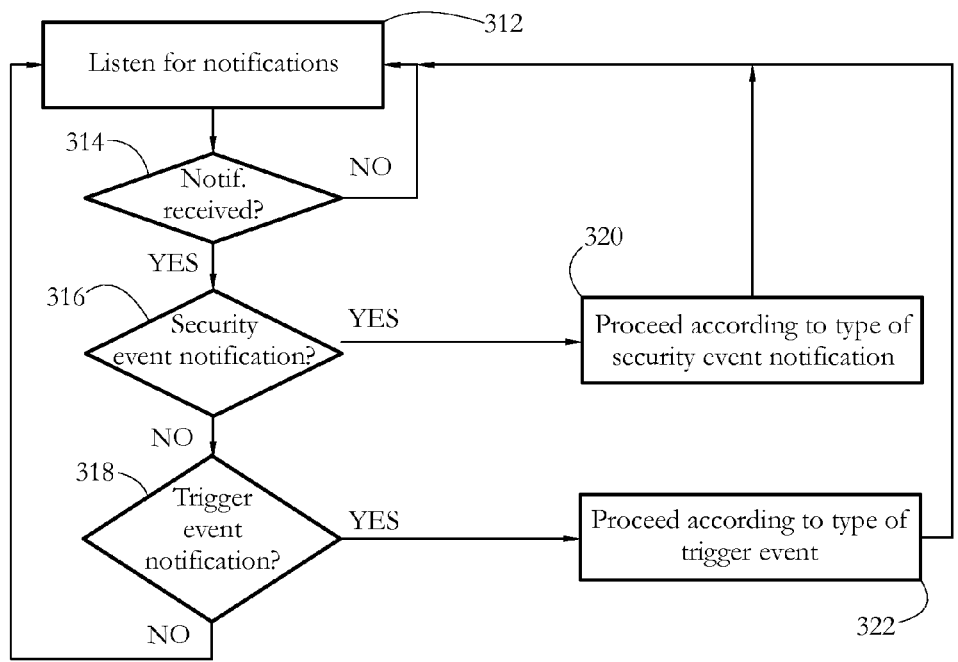
FIG. 12 shows an exemplary sequence of steps performed by the decision unit of FIGS. 7-8 according to some embodiments of the present invention.

FIG. 12 shows an exemplary sequence of steps performed by decision unit 72 according to some embodiments of the present invention. In a sequence of steps 312-314, decision unit 72 waits for the receipt of a notification. Such notifications may be communicated either by activity monitor 74 (see above), or by anti-malware engine 56 (see e.g., security event notification 64 in FIG. 7). When a notification is received, a step 316 determines whether the notification is a security event notification received from anti-malware engine 56, and when yes, in a step 320, decision unit 72 proceeds according to the type or security event notification received (more details below). When no, a step 318 determines whether the notification is a trigger event notification received from activity monitor 74, and when yes, in a step 322, decision unit 72 proceeds according to the type of trigger event communicated via the notification.

Figure 13:
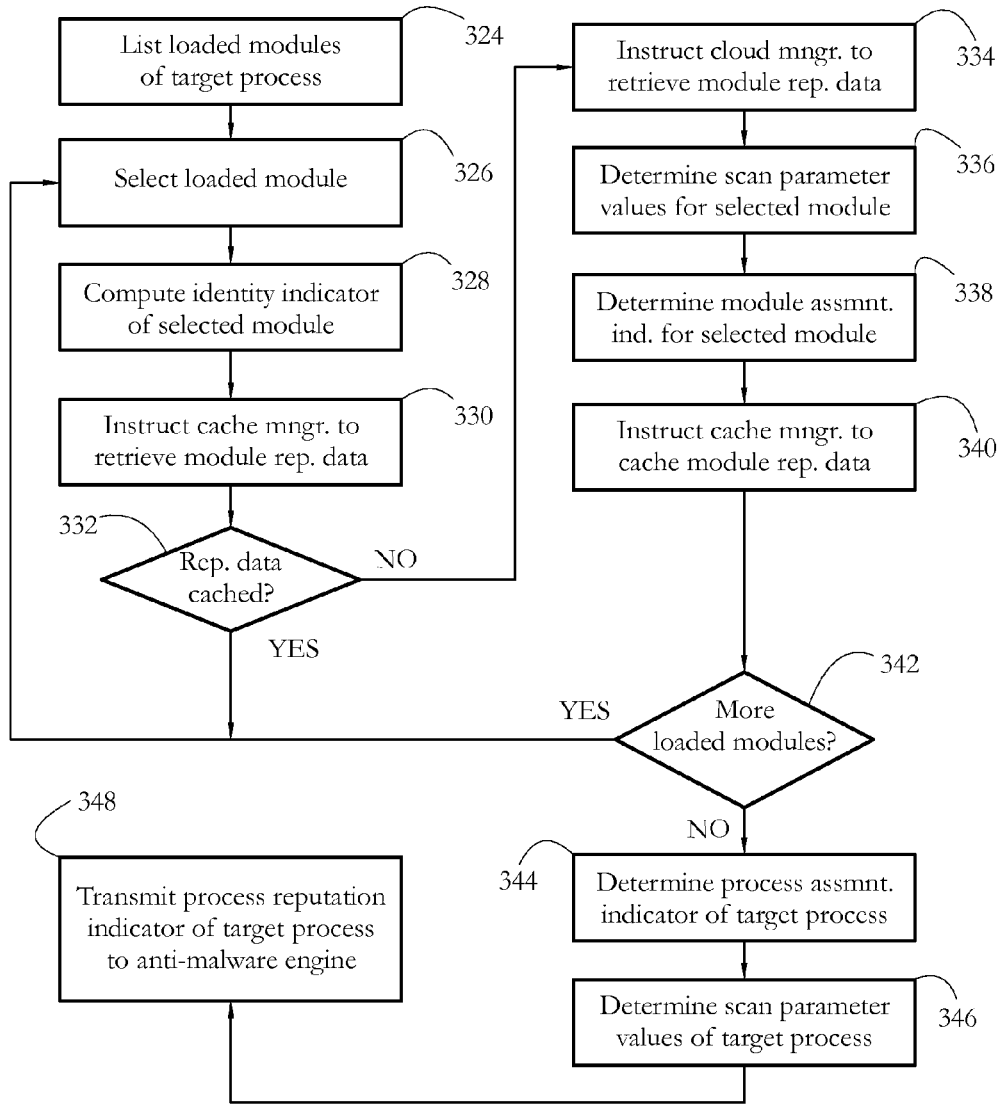
FIG. 13 shows an exemplary sequence of steps performed by the decision unit upon receiving notification indicating a process launch, according to some embodiments of the present invention.

FIG. 13 shows an exemplary sequence of steps carried out by decision unit 72 within step 322 (FIG. 12), when the trigger event comprises the launch of a process. In a step 324, decision unit 72 may determine the set of executable modules loaded by the respective process. To perform step 324, decision unit 72 may employ any method known in the art. For instance, in client systems running a Windows® OS, upon launching a process, OS 46 sets up a process-specific data structure known as a process environment block (PEB) comprising data used by OS 46 to manage resources associated to the respective process. Such data includes virtual memory addresses of loaded modules. Decision unit 72 may therefore identify the loaded modules according to the PEB of the respective process.

Next, decision unit 72 may execute a sequence of steps 326-342 in a loop, for each module loaded by the targeted process. A step 326 selects a loaded module. In a step 328, decision module computes an identification indicator of the selected module, the identification indicator allowing cache 222 and/or server 214 to unambiguously identify the selected module. In some embodiments, the identity indicator includes a hash of a code section of the selected module, or a code section of the selected module, among others. Exemplary hash functions used to compute the hash include secure hash (SHA) and message digest (MD) algorithms. In some embodiments, cache manager 70 may use the identifying hash as a lookup key into cache 222. Other exemplary identity indicators may include metadata of the respective module, such as a filename, a size, a version, and a timestamp of the selected module, among others.

A step 330 instructs cache manager 70 to retrieve module reputation data of the selected module from cache 222. Step 330 may include sending the identity indicator of the selected module to cache manager 70 and receiving module reputation indicator 80 of the selected module from cache manager 70. A step 332 determines whether cache lookup was successful, i.e., whether reputation data of the selected module was found in cache 222, and when yes, decision unit advances to a step 342 described below. When cache 222 does not currently hold the requested reputation data (for instance, when the requested reputation data has expired from cache 222), in a step 334, decision unit 72 may instruct cloud manager 68 to retrieve reputation data from reputation server 214. Step 334 may include sending a reputation request comprising the identity indicator (e.g., hash identifier) of the selected module to server 214 and receiving cloud reputation indicator 78 of the respective module from server 214. To retrieve indicator 78, some embodiments of server 214 may use the identifying hash of the selected module as a lookup key into central reputation database 16 and/or environment-specific reputation database 24. When such database lookup fails, i.e., when no reputation data for the selected module was found in the reputation database(s), server 214 may return an indicator of failure.

In a sequence of steps 336-338, decision unit 72 may formulate module reputation indicator 80 of the selected module according to cloud reputation indicator 78 of the selected module. In some embodiments, determining module scan parameter values 81a and cache expiration indicator 81b comprises copying the respective values from cloud reputation indicator 78 (items 79a and 79b, respectively, see FIGS. 10-A-B). In some embodiments, in step 338, decision unit 72 may determine module assessment indicator 81c as either trusted, untrusted, or unknown. In one example, the selected module is declared trusted when database look-up was successful, i.e., when step 334 returned a cloud reputation indicator for the selected module. When no reputation data for the selected module was found in the reputation database(s), the selected module may receive an assessment of unknown (neutral). In some embodiments, when decision unit 72 has received a security notification from anti-malware engine 56 indicating that the selected module (or a distinct instance of the selected module) is suspected of malice, the selected module may receive an assessment of untrusted, irrespective of whether step 334 returned a cloud reputation indicator for the selected module or not.

In a step 340, decision unit 72 instructs cache manager 70 to store reputation data of the selected module (such as indicator 80) in cache 222. In some embodiments, cache manager may alter the value of cache expiration indicator 81b when the respective module is suspected of malice. For instance, when decision unit has received a security notification regarding the respective module, indicator 81b may be modified to indicate a permanent record (no expiration time).

A step 342 then determines whether there are any more executable modules left to process, and if yes, execution returns to step 326 described above. When the last executable module of the target process has been processed, a sequence of steps 344-346 determines process reputation indicator 82 of the target process, according to module reputation indicators 80 of executable modules making up the target process. An exemplary decision table for determining process reputation indicator 82 is given in Table 1.

TABLE 1

| Module assessment indicators | Process assessment indicator |
|---|---|
| All Positive/Trusted | Positive/Trusted |
| At least one Neutral/Unknown, all the rest Positive/Trusted | Neutral/Unknown |
| At least one Negative/Untrusted | Negative/Untrusted |

In step 346, decision unit 72 determines scan parameter values 83a of the target process according to scan parameter values 81a of executable modules constituting the target process. In some embodiments, for each security feature 76a-d (FIG. 7), the respective set of process scan parameters values 83a is determined according to a set operation applied to module scan parameter value sets 81a of the executable modules composing the target process, parameter value sets 81a corresponding to the respective feature. Exemplary set operations used to determine process scan parameter values 83a include union and intersection, among others. Alternatively, when module scan parameter sets 81a comprise binary values, set operations may include the logical AND and OR operators. An example of such determination of process scan parameter values 83a is given below, for process 84b of FIG. 9. Table 2 shows exemplary module scan parameter values 81a of each module constituting process 84b, and the resulting process scan parameter values 83a of process 84b.

TABLE 2

| Type of scan parameter | Module name | Scan parameter values, feature $F_1$ | | Scan parameter values, feature $F_2$ | |
|---|---|---|---|---|---|
| | | Intersection/ AND | Union/ OR | Intersection/ AND | Union/ OR |
| Module | B.exe | $\{a_2, a_4\}$ | N/A | $\{b_1\}$ | N/A |
| Module | X.dll | $\{a_4\}$ | $\{a_1\}$ | $\{b_1\}$ | N/A |
| Module | Y.dll | $\{a_2, a_4\}$ | N/A | $\{b_1\}$ | $\{b_3\}$ |
| Module | Z.dll | $\{a_2, a_3, a_4\}$ | N/A | $\{b_1, b_2\}$ | N/A |
| Process | B | $\{a_4\}$ | $\{a_1\}$ | $\{b_1\}$ | $\{b_3\}$ |

In the example of Table 2, the third and fifth columns list parameter value sets that are processed using an Intersection/AND operator, while the fourth and sixth columns list parameter value sets that are processed using a Union/OR operator. Feature $F_1$ may be a real-time protection procedure, and feature $F_2$ may be a behavioral scanner. Scan parameter values may have the following exemplary meaning:

$a_1$: activate anti-virus technology $T_1$;
$a_2$: do not monitor attempts to READ a disk file.
$a_3$: do not monitor attempts to WRITE to a disk file.
$a_4$: scan only executable files;
$b_1$: disable heuristic set $H_1$;
$b_2$: disable heuristic set $H_2$;
$b_3$: activate behavioral scan technology $T_2$;

In some embodiments, decision unit 72 may take the intersection of sets $\{a_2, a_4\}$, $\{a_4\}$, $\{a_2, a_4\}$, and $\{a_2, a_3, a_4\}$, to produce $\{a_4\}$, and the union of sets $\{a_1\}$ and $\{N/A\}$ to produce $\{a_1\}$. Decision unit 72 may further take the union of the two resulting sets $\{a_1\}$ and $\{a_4\}$, to produce $\{a_1, a_4\}$ as the set of process scan parameter values 83a of process B, corresponding to security feature $F_1$. Similarly, for security feature $F_2$, decision unit 72 may take the intersection of sets $\{b_1\}$, $\{b_1\}$, $\{b_1\}$, and $\{b_1, b_2\}$, to produce $\{b_1\}$, and the union of sets $\{b_3\}$ and $\{N/A\}$, to produce $\{b_3\}$. The set $\{b_1, b_3\}$, determined as a union of the resulting sets $\{b_1\}$ and $\{b_3\}$, may thus represent the set of process scan parameter values 83a of process B, corresponding to security feature $F_2$. Using the above-listed meaning of various parameters, process scan parameter values 83a instruct anti-malware engine 56, so that in scanning process B, the real-time protection component should only scan executable objects, and should activate anti-virus technology T1, while the behavioral scanner component should disable heuristic set $H_1$ and activate behavioral scan technology $T_2$.

After computing process scan parameter values 83a and process assessment indicator 83c, decision unit may assemble process reputation indicator 82 of the target process and transmit indicator 82 to anti-malware engine 56 in a step 348.

Figure 14:
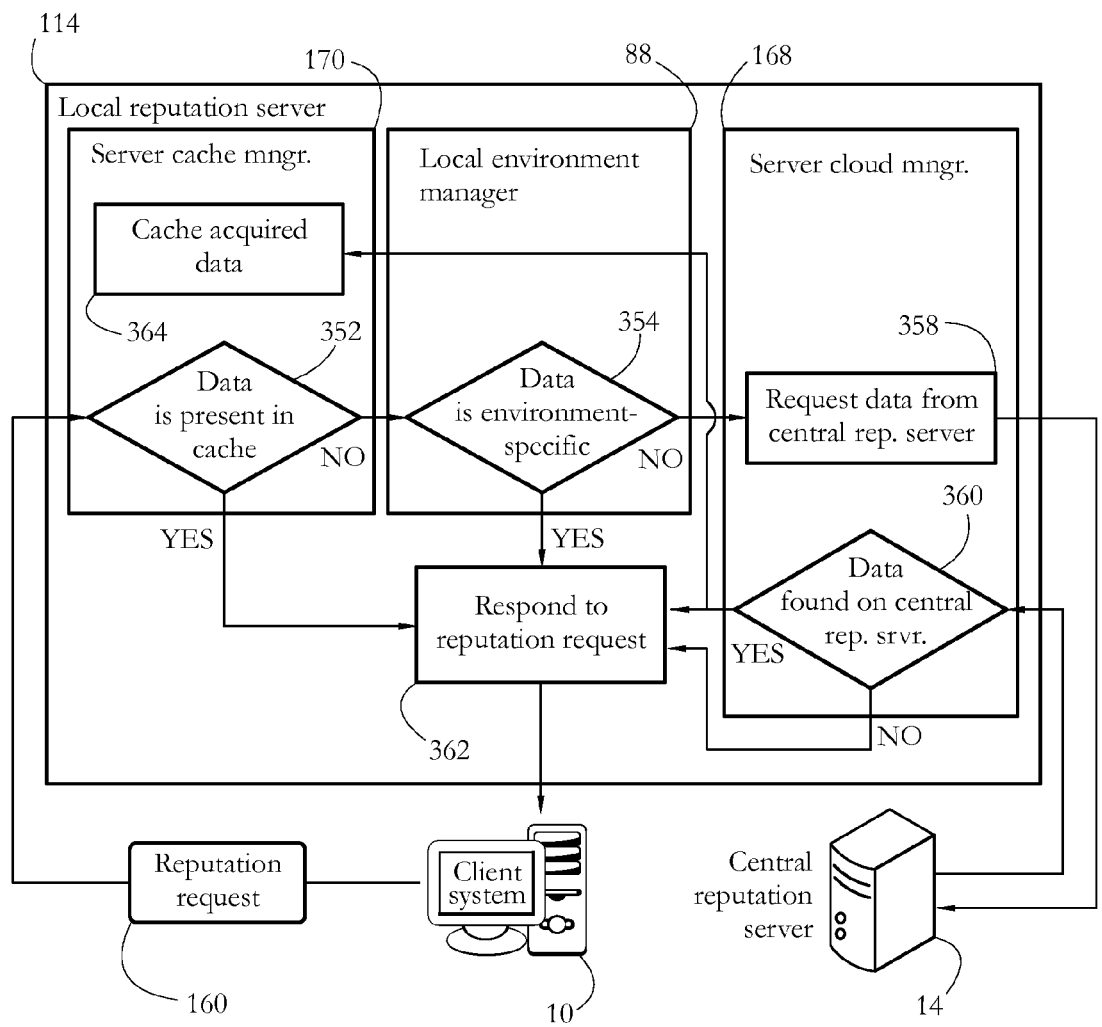
FIG. 14 shows an exemplary sequence of steps performed by a local reputation server according to some embodiments of the present invention.

FIG. 14 illustrates an exemplary processing of a reputation request in an isolated environment, such as environments 12a-b in FIG. 1. Compared to the exemplary system illustrated in FIGS. 7-8, the system of FIG. 14 introduces an additional level of caching and server look-up between central reputation server 14 and end-clients 10. Such configurations may expedite anti-malware operations by lowering the data traffic between server 14 and end client systems 10.

Configurations like the one depicted in FIGS. 2 and 14 may also enable an environment-specific manner of handling reputation data. In some embodiments, environment-specific reputation database 24 comprises a set of cloud and/or module reputation indicators, specifically tailored to the respective isolated environment 12. In one such example, client systems 10d-e (FIG. 2) of a corporate Intranet run a widely used software application X, such as Microsoft Office®. Application X loads an executable module Y, which is vulnerable to malware as long as the respective client system is connected to the Internet. When local network 120 connecting client systems 10d-e is not directly connected to the Internet, for instance, when network 120 is protected by a firewall, application X no longer suffers from the vulnerabilities associated to Internet connectivity. Therefore, monitoring application X for such vulnerabilities may not be necessary on systems 10d-e (i.e., within isolated environment 12), whereas such monitoring may be important in systems directly connected to the Internet. In some embodiments, scan parameters configuring anti-malware engine 56 may be set to different values, according to whether the respective client system running engine 56 operated within or outside isolated environment 12. Engine 56 may thus be configured to scan/monitor an instance of module Y executing within environment 12 in a manner distinct from an instance of module Y executing outside environment 12.

In another example of environment-specificity, an enterprise uses a proprietary software application X, which is not used by other client systems outside isolated environment 12. Reputation data concerning an executable module Y of application X is therefore not likely to be used by other client systems. In some embodiments, such reputation data is only saved in environment-specific reputation database 24, and not in central reputation database 16. Such configurations may increase the efficiency of database lookups for clients operating outside isolated environment 12, as well as for clients operating inside environment 12.

In some embodiments, the execution flow depicted in FIG. 14 parallels the execution of steps 328-340 in FIG. 13. Local reputation server 114 may comprise a server cache manager 170, a local environment manager 88, and a server cloud manager 168. The operation of server cache manager 170 and server cloud manager 168 may mirror the operation of cache manager 70 and cloud manager 68, respectively, described above in relation to FIGS. 7-8 and FIG. 13. In some embodiments, when reputation manager 58 of client system 10 requires reputation data of a target executable module, manager 58 may formulate a reputation request 160 comprising the identity indicator (e.g., hash identifier) of the target module, and may transmit request 160 to local reputation server 114 over local network 120. In a step 352, server cache manager 170 looks up reputation data for the respective module in server reputation cache 22. When such data exists in cache 22, execution advances to a step 362 described below. When the reputation data is not cached, in a step 354, local environment manager 88 looks up the reputation data in environment-specific reputation database 24. When the reputation data is found in database 24, execution advances to step 362. When the reputation data is not found in database 24, in a step 358, server cloud manager 168 may request the reputation data from central reputation server 14. Then, in a step 360, server cloud manager 168 determines according to a response received from server 14 whether central reputation server 14 has retrieved the requested data. When cloud manager 168 receives reputation data, such as cloud reputation indicator 78 of the respective module, local reputation server 114 computes module reputation indicator 80 of the respective module (see, e.g., description of steps 336-338 in FIG. 13), and in a step 364, server cache manager saves indicator 80 in server reputation cache 22. In a step 362, local reputation server 114 may send a response to reputation request 160 to requesting client 10. In some embodiments, step 362 may further comprise computing a process reputation indicator 82 (see, e.g., description of steps 344-346 in FIG. 13).

In another example of execution of step 322 (FIG. 12), the trigger event comprises a target process loading an executable module, such as a DLL. In some embodiments, loading a new module may change reputation indicator 82 of the target process. For instance, loading an untrusted module may degrade the reputation of a process from positive/trusted to neutral/unknown or even to negative/untrusted. Re-computing indicator 82 may comprise, for instance, executing steps 328 through 340 (FIG. 13), wherein the selected module is the newly loaded executable module, to determine module reputation indicator 80 of the respective module. Then, decision unit 72 may determine indicator 82 in a manner similar to the one described above, in relation to steps 344-346. For instance, process assessment indicator 83*c* may be determined according to a decision table (see, e.g., Table 1), and process scan parameter values 83*a* may be updated by combining current values 83*a* with module scan parameter values 81*a* of the newly loaded module, using operators such as union/OR and intersection/AND.

In another example of execution of step 322 (FIG. 12), the trigger event comprises a target process unloading an executable module, such as a DLL. In such cases, decision unit 72 may re-calculate process reputation indicator 82 of the target process, to reflect the new module composition of the target process. To recalculate indicator 82, some embodiments may execute the sequence of steps illustrated in FIG. 13. In some embodiments, decision unit 72 may decide whether to re-calculate process reputation indicator 82 according to the current process assessment indicator 83*c* of the target process. For instance, when the target process is currently assessed as negative/untrusted, decision unit may maintain the negative/untrusted assessment for the lifetime of the target process, without re-calculating indicator 82.

Figure 15:
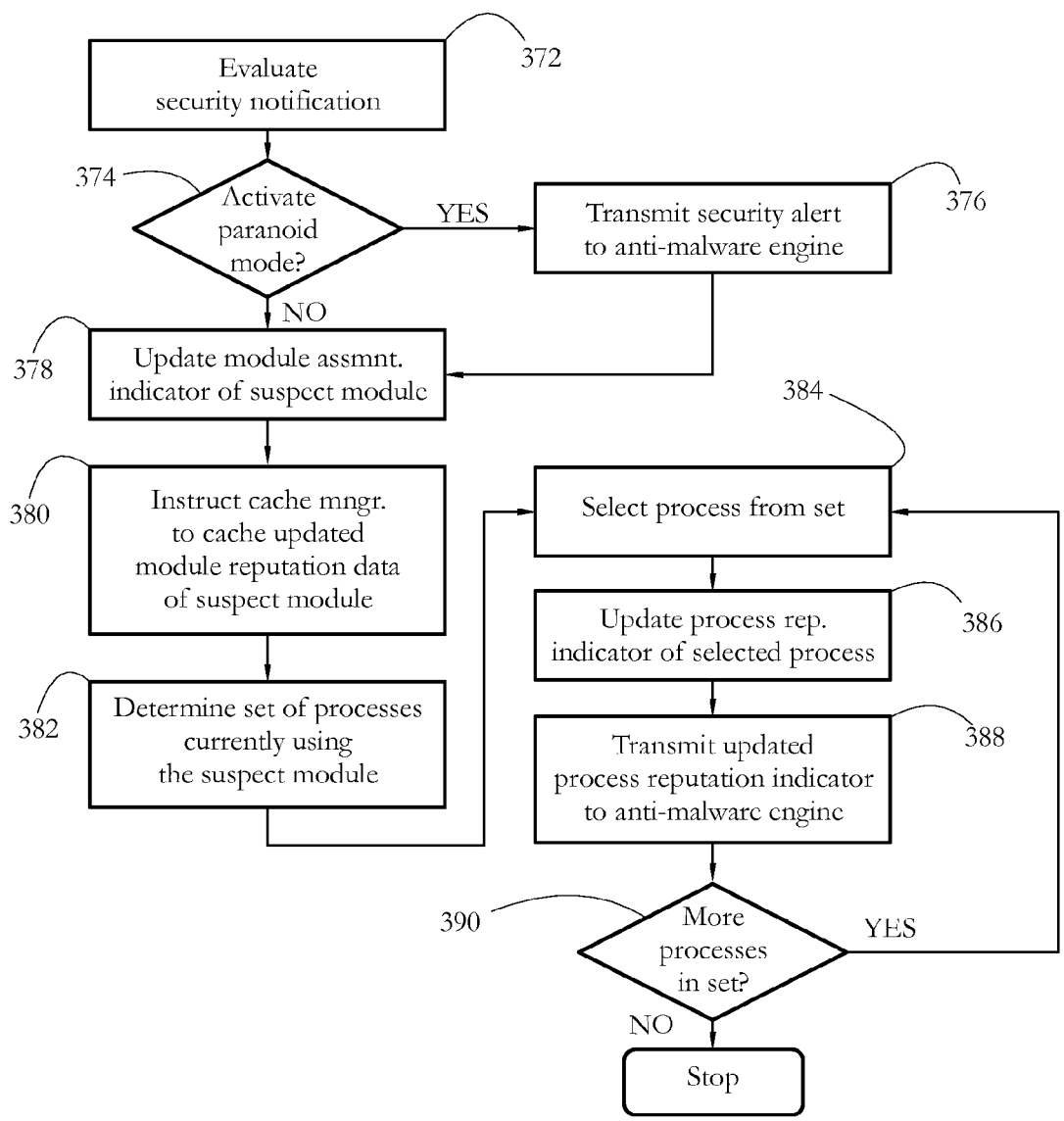
FIG. 15 illustrates an exemplary sequence of steps performed by the decision unit (FIGS. 7-8) upon receiving a security notification, according to some embodiments of the present invention.

FIG. 15 shows an exemplary sequence of steps performed by decision unit 72 upon receiving a security event notification (step 320 in FIG. 12). In some embodiments, security event notification 64 (FIG. 7) includes an indicator of a suspect process and/or suspect module, and an indicator of a type of security event triggering the respective notification. For instance, notification 64 may indicate that module X of process Y has injected code into process Z; in this example, X may be the suspect module, Y may be the suspect process, and code injection may be the trigger security event. A step 372 evaluates security notification 64, for instance to extract the type of security event and to identify a suspect process and/or a suspect module. In a step 374, decision unit 72 may determine whether the security event identified in step 372 justifies instructing anti-malware engine 56 to enter a particular mode of operation, referred to as paranoid mode. When yes, in a step 376, decision unit 72 may transmit security alert 66 (FIG. 6) to anti-malware engine 56.

In some embodiments, activating paranoid mode may further include temporarily changing process assessment indicators 83*c* of all processes currently in execution to negative/untrusted, for a pre-determined period of time, such as a few minutes, which will be referred to as a paranoid mode time span. After the paranoid mode time span has elapsed, the reputation indicators of all processes may be restored to values preceding security alert 66. In some embodiments, the paranoid mode time span is event-specific: some security events warrant activating paranoid mode for a longer time than other security events. When more than one security events occur at approximately the same time, some embodiments set the paranoid mode time span at a value at least as large as the longest paranoid mode time span of all individual security events. When several security events occur in sequence, the paranoid mode time span may be cumulative, or may be determined so as to expire synchronously with the paranoid mode time span of the last event in the sequence. More details about paranoid mode are given below.

When instituting paranoid mode is not justified, in a step 378, decision unit 72 may update module assessment indicator 81*c* of the suspect module, according to the type of security event identified in step 372. Updating the module assessment indicator may indicate, for instance, downgrading the suspect module from trusted to neutral or untrusted, depending on the severity of the security event. In a step 380, decision unit 72 may instruct cache manager 70 to save the updated reputation data of the suspect module in cache 222. Step 380 may further comprise sending a reputation feedback to database update system 18, instructing system 18 to include the update in central reputation database 16 (for details, see below).

Decision unit 72 may then identify a set of processes currently using instances of the suspect module. Identifying such processes may proceed according to information managed and provided by activity monitor 74. Next, decision unit may execute a sequence of steps 384-390 in a loop, for each process in the respective set, to update reputation indicators 82 of such processes. Such updating may effectively propagate new security data concerning the suspect module throughout client system 10. A step 384 selects a process from the set of processes currently having an instance of the suspect module loaded into their memory spaces. A step 386 may re-calculate process reputation indicator 82 of the selected process, using, for instance, the sequence of steps described above in relation to FIG. 13. As a result of step 386, the reputation of some processes may be downgraded from positive/trusted to neutral/unknown, or to negative/untrusted; similarly, some processes may be downgraded from neutral/unknown to negative/untrusted. A step 388 may transmit updated process reputation indicator 82 of the selected process to anti-malware engine 56. In a step 390, decision unit 72 checks whether there are any more processes not yet updated, and when yes, returns to step 384.

Figure 16:
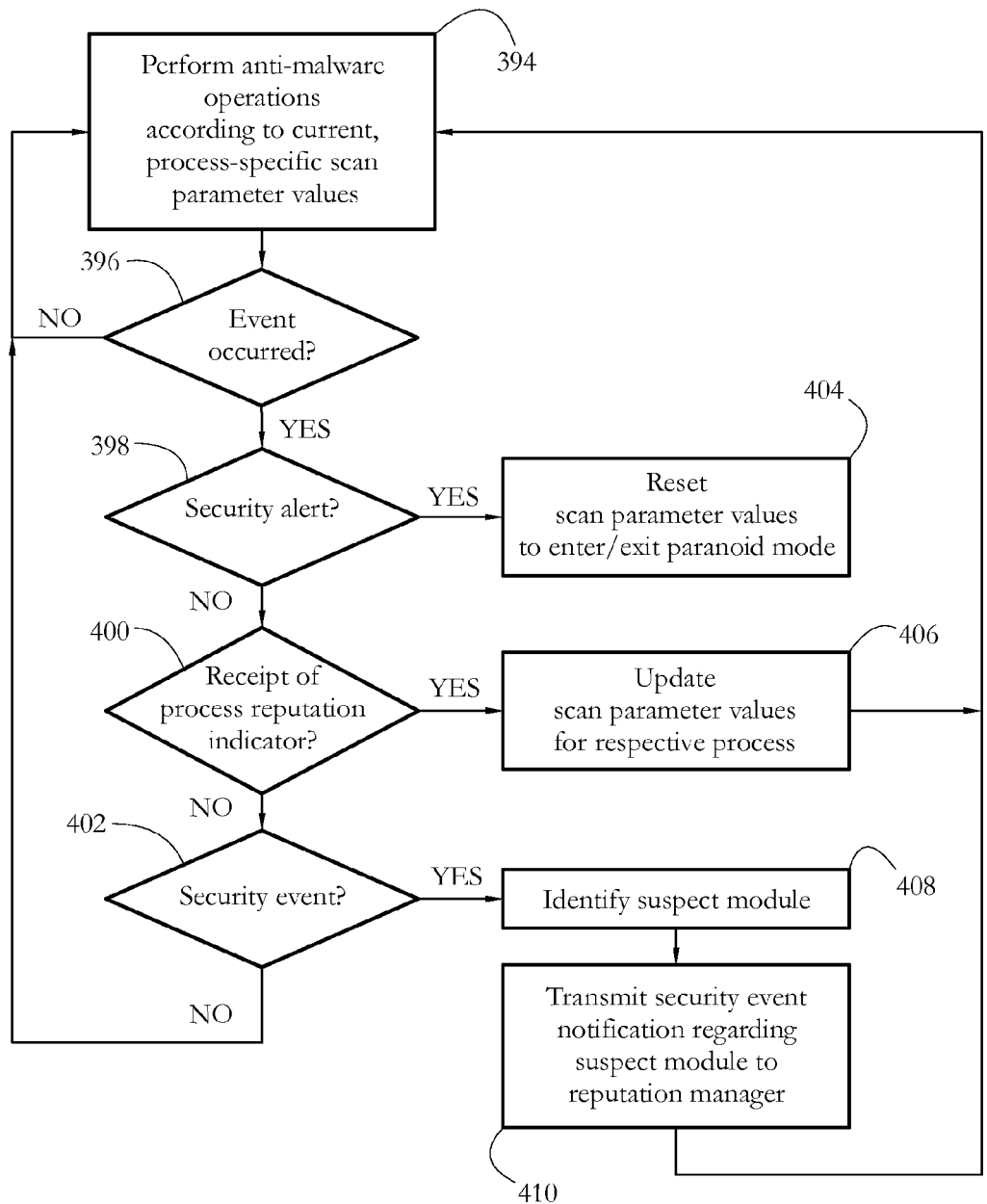
FIG. 16 shows an exemplary sequence of steps performed by the anti-malware engine (FIGS. 6-7) according to some embodiments of the present invention.

FIG. 16 illustrates an exemplary sequence of steps performed by anti-malware engine 56 according to some embodiments of the present invention. Engine 56 may execute concurrently with reputation manager 58, and may exchange notifications and/or reputation data with manager 58 as described above. In a sequence of steps 394-396, anti-malware engine 56 is configured to wait for the occurrence of an event, while performing anti-malware operations such as detecting and/or removing malware. Malware detection may include monitoring a set of processes and/or executable modules currently executing on client system 10 and, for instance, intercepting certain actions performed by the respective processes and/or modules and determining whether such actions are malicious or malware-indicative. In some embodiments, security features 76a-d of engine 56 may be configured independently of each other by adjusting feature-specific scan parameters. By adjusting the value of such scan parameters, engine 56 may be configured to operate in each of a plurality of distinct modes and/or protocols of operation. In some embodiments, such scan parameters may be set independently for each process and/or executable module, so that engine 56 may scan/monitor each such process or module using a potentially distinct protocol. Examples of process-specific scan parameter values are scan parameter values 83a of process reputation indicator 82, transmitted by reputation manager 58 to engine 56 as shown above.

Step 396 determines whether an event has occurred, and when no, returns execution to step 394. Such events comprise security events occurring within client system 10, as well as receiving security alerts 64 and process reputation indicators 82 from reputation manager 58. When an event has occurred, in a step 398, engine 56 may determine whether the event comprised receiving a security alert, and when no, engine 56 may proceed to a step 400. In some embodiments, security alerts 66 instruct engine 56 to enter or exit paranoid mode. To enter paranoid mode, in a step 404 engine 56 may reset scan parameters of security features 76a-d to a pre-determined set of values corresponding to a strict security protocol, thus overruling any process-specific values received from reputation manager 58. In some embodiments, the strict security protocol activated within paranoid mode includes activating security features that may otherwise be dormant to save computational resources. Such features may include detection routines and/or procedures specifically targeted at the type of threat that triggered the respective security alert. Paranoid mode may further include, among others, activating an additional set of detection heuristics, and disabling a set of optimizations used to speed-up anti-malware operations. In some embodiments, paranoid mode may be activated for a limited period of time indicated in security alert 66; paranoid mode may expire automatically after the indicated period, or may be turned off in response to receiving a security alert 66 explicitly instructing engine 56 to exit paranoid mode. In some embodiments, exiting paranoid mode comprises resetting scan parameters to process- and/or module-specific values recorded prior to the activation of paranoid mode.

In step 400, anti-malware engine 56 determines whether the event comprises receiving a process reputation indicator from reputation manager 58, and when no, engine 56 proceeds to a step 402. When a reputation indicator was received, in a step 406, anti-malware engine may update scan parameter values to the new values indicated by the received reputation indicator.

In step 402, engine 56 determines whether the event is a security event (for instance, a process has injected a library into another process), and when no, engine 56 returns to step 394. When a security event was indeed detected, a step 408 identifies a suspect module and/or a suspect process triggering the respective security event, and in a step 410, engine 56 transmits security event notification 64 indicating the identity of the suspect module and the type of security event to reputation manager 58.

Figure 17:
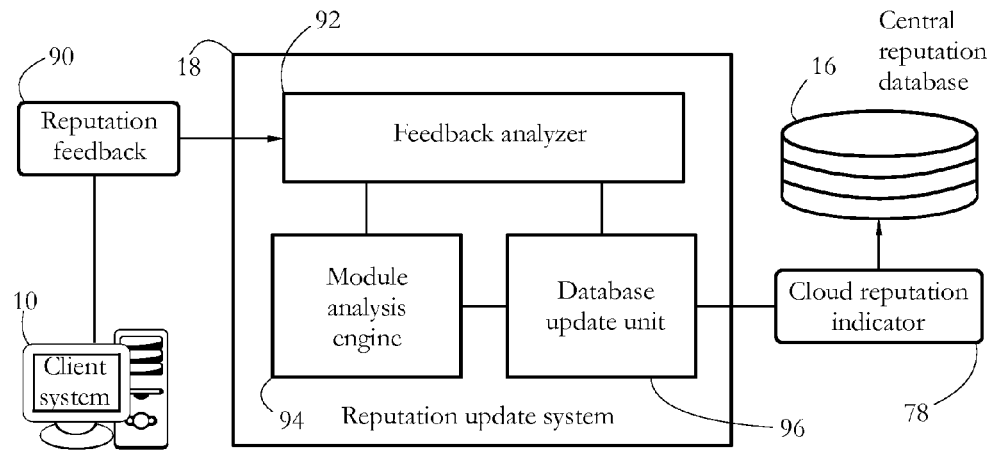
FIG. 17 shows an exemplary configuration of the reputation update system of FIG. 1, according to some embodiments of the present invention.

FIG. 17 shows an exemplary configuration of reputation update system 18 (see e.g., FIG. 1), according to some embodiments of the present invention. System 18 may be configured to keep reputation data stored in central database 16 up to date, by changing current reputation data of familiar modules in response to receiving a reputation feedback 90 concerning the respective modules from client system 10a-e, and/or by adding to central reputation database 16 reputation data determined for unfamiliar modules identified in reputation feedback 90. In some embodiments, familiar modules represent software objects for which database 16 already contains reputation data, while unfamiliar modules represent objects for which no reputation data is available in database 16 when feedback 90 is received. Information about unfamiliar modules may be received from client systems 10a-e, and/or from software vendors releasing new products or product updates.

In some embodiments, reputation update system 18 comprises a feedback analyzer 92, a module analysis engine 94 connected to feedback analyzer 92, and a database update unit 96 connected to analyzer 92 and engine 94. Module analysis engine 94 may be configured to assess the reputation of unfamiliar modules, and to formulate cloud reputation indicators 78 for such modules. In some embodiments, engine 94 is configured to collect a record of actions and/or behaviors of each module, the record allowing an operator and/or a machine to derive optimal scan parameter values for the respective unfamiliar module. Such derivation and/or optimization of scan parameter values may be carried out by any method known in the art. To collect records, engine 94 may employ event detection components, which may be configured to intercept runtime events such as the launch of a child object, or the injection of code by the respective unfamiliar module. In some embodiments, module analysis engine 94 may be further configured to determine cloud scan parameter values 79a and/or cache expiration indicator 79b for the respective unfamiliar module. Such determinations may be entirely automatic, performed by components of engine 94, or may be supervised by human operators.

Figure 18:
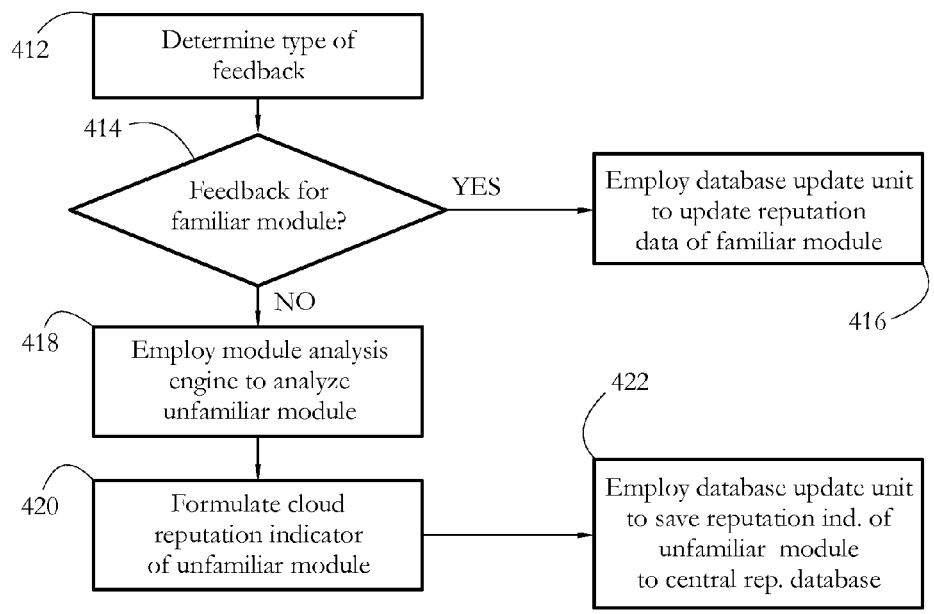
FIG. 18 illustrates an exemplary sequence of steps performed by the reputation update system according to some embodiments of the present invention.

FIG. 18 illustrates an exemplary sequence of steps performed by update system 18 upon receiving reputation feedback 90 from client system 10. In some embodiments, reputation feedback 90 includes an identity indicator (e.g., hash identifier) of an executable module, indicating the respective module as a subject of feedback 90. When the respective module is familiar, reputation feedback 90 may further comprise an indicator of a change in the reputation of the respective module. In some embodiments, the reputation is described by a module assessment indicator (see, e.g., item 81c in FIG. 10-B), indicating, for instance, that the respective module has a positive, neutral, or negative reputation. Changes in reputation may be triggered by the respective module causing a security event in client system 10 (see also discussion above related to steps 402, 408, and 410 in FIG. 16). For instance, when a module performs a malware-indicative action, its reputation may be downgraded from positive/trusted to neutral/unknown or even negative/untrusted. In such cases, reputation feedback 90 may further comprise an indicator indicative of a type of security event (e.g., code injection) caused by the respective module. When reputation feedback 90 refers to an unfamiliar module, feedback 90 may include a section of code, for instance all executable code of the respective module, and/or metadata such as a module filename, a byte size, a timestamp, and a path of the respective module, among others.

In a sequence of steps 412-414, feedback analyzer 92 determines a type of feedback (e.g., reputation update) indicated by reputation feedback 90, and determines whether feedback 90 refers to a familiar or to an unfamiliar executable module. When the respective module is familiar, in a step 416, system 18 employs database update unit 96 to update the reputation data currently held in central reputation database 16 regarding the respective module, to reflect the change in reputation indicated by feedback 90. In some embodiments, when the reputation of the respective module is downgraded from positive/trusted to neutral/unknown or to negative/untrusted, database update unit 96 may delete the reputation record of the respective module from central reputation database 16. In such embodiments, database 16 may effectively store only records of executable modules currently rated as positive/trusted.

When feedback 90 indicates an unfamiliar module, in a step 418, reputation update system 18 sends data of the respective module to module analysis engine 94 for analysis. In step 418, engine 94 may determine whether the respective module is likely to be malicious by analyzing a section of code of the respective module. Engine 94 may further determine a set of features of the unfamiliar module, such as determine whether the respective module performs any of a pre-determined set of actions (e.g., downloads files from the network, writes files to the disk, injects code, etc.). In some embodiments, step 418 may also include classifying the unfamiliar module into one of a plurality of classes or categories of executable modules (e.g., main executable, shared library, etc.).

In a step 420, module analysis engine 94 may determine a cloud reputation indicator for the respective module, including a set of scan parameters values used to configure client anti-malware engines 56. Next, in a step 422, reputation update system 18 may employ database update unit to save cloud reputation indicator 78 determined for the unfamiliar module to central reputation database 16. In some embodiments, step 422 is performed only for unfamiliar modules which have received a positive/trusted reputation assessment from engine 94.

The exemplary systems and methods described above allow protecting a client system, such as a computer system, from malware such as viruses, Trojans, and spyware. In some embodiments, a reputation manager executes concurrently with an anti-malware engine. The anti-malware engine performs operations such as detecting malware executing on the respective client system and/or removing or incapacitating such malware. For each process executing on the client system, the reputation manager may transmit a reputation indicator to the anti-malware engine, the reputation indicator indicative of a level of trust that the respective process is not malicious.

In conventional anti-malware systems, software objects are scanned regardless of their reputation. In contrast, in some embodiments of the present invention, the anti-malware engine may give preferential treatment to trusted objects. For instance, the anti-malware engine may use a less computationally expensive protocol to scan a trusted object, compared to what it would use to scan an unknown object. In one such example, a subset of features of the anti-malware engine may be disabled when scanning trusted objects. Such an approach may substantially improve anti-malware performance, by reducing the computational burden associated with scanning trusted objects.

In some embodiments, the anti-malware engine may be configured to operate in a plurality of distinct modes, by adjusting a set of scan parameters. Adjusting the values of the scan parameters in a process-specific manner enables the anti-malware engine to scan each process using a process-specific method or protocol. In some embodiments, scan parameter values are chosen according to a reputation of the respective object, hence the anti-malware method or protocol may vary according to the reputation of the scanned object.

Some conventional anti-malware systems attempt to reduce the computational burden of scanning by applying a set of optimizations to the anti-malware routines. Such optimizations may include determining whether a target object belongs to a particular category of objects, according to a set of features of the respective object, and giving preferential treatment to the objects that belong to the respective category. Such optimizations may not translate efficiently from one type of malware to another, and may be exploited by malware agents specifically designed to evade detection by fitting into the respective category. In contrast, in some embodiments of the present invention, an object is given preferential treatment according to a reputation indicative of a level of trust that the respective object is non-malicious, and not according to a feature of the respective object. Such an approach may readily translate from one type or category of malware to another, including emerging threats. Moreover, since the reputation manager operates independently from the anti-malware engine, the anti-malware engine may be upgraded to incorporate new scanning methods and procedures, without affecting the operation of the reputation manager.

In some embodiments of the present invention, the reputation of a target software object may be determined according to the reputation of a set of building blocks of the respective object. Examples of such building blocks include a main executable of a process, and a shared library loaded by the respective process, among others. The reputation of each building block may be static; an indicator of such reputation may be stored in a local repository (e.g., a local cache) and/or a remote repository (e.g., a central reputation database), and reused for every instance of the respective building block. In contrast, the reputation of the target object itself may be dynamically changeable, computed repeatedly by the reputation manager in response to security events and/or life-cycle events of the target object.

The reputation of a building block, such as a shared library, may indicate a level of trust that the respective building block is not malicious. Such reputations of individual building blocks may be determined according to the behavior of a plurality of distinct instances of such building blocks, distributed across a plurality of client systems remotely connected to a central reputation server. In some embodiments of the present invention, stored reputation data of a building block may be updated in response to a security event involving an instance of the respective building block. In one such example, when a shared library performs a malware-indicative action, the reputation of the respective library may be downgraded from trusted to unknown or to untrusted. An updated indicator of reputation may be saved in a local cache and/or transmitted to the central reputation database. Such configurations allow any change in reputation to propagate swiftly to other local processes using instances of the respective shared library, and further to other client systems connected to the reputation server.

In some embodiments, the stored reputation data of a building block includes a set of scan parameter values used to configure the anti-malware engine to monitor the respective building block and/or processes comprising an instance of the respective building block. Such parameter values indicating, for instance, what heuristics to use to monitor the behavior of the respective object, may de determined by human operators or automatically by a machine. Optimal scan parameter values may de determined, for instance, by monitoring the execution of the respective executable module in a controlled environment and determining a set of behavioral and/or static features of the module. Scan parameter values may be updated efficiently to address newly discovered types and variants of malware agents. Through the mechanism of server and/or cache reputation look-ups described above, such updates may then propagate to all client systems connected to the reputation server.

It will be clear to one skilled in the art that the above embodiments may be altered in many ways without departing from the scope of the invention. Accordingly, the scope of the invention should be determined by the following claims and their legal equivalents.

What is claimed is:

1. A client system comprising:
a memory, and
at least one hardware processor connected to the memory and configured to execute an anti-malware engine configured to monitor a target process for malicious activity, wherein the target process executes on the client system, wherein the target process comprises an instance of a main executable module and an instance of a shared library, and wherein the at least one hardware processor is further configured to:
receive from a server a first module reputation indicator of the main executable module and a second module reputation indicator of the shared library, the first module reputation indicator determined according to a behavior of another instance of the main executable module, wherein the server is configured to perform anti-malware transactions with a plurality of client systems including the client system, wherein the first module reputation indicator comprises an indicator of a first set of monitoring rules, and wherein the second module reputation indicator comprises an indicator of a second set of monitoring rules;
in response to receiving the first and second module reputation indicators, determine whether the target process is likely to be malicious according to the first and second module reputation indicators; and
in response to determining whether the target process is likely to be malicious, when the target process is not likely to be malicious,
combine the first and second sets of monitoring rules into a combined set of monitoring rules, and
configure the anti-malware engine to monitor the target process according to the combined set of monitoring rules.

2. The client system of claim 1, wherein the at least one hardware processor is configured to determine the combined set of monitoring rules according to a union of the first and second sets of monitoring rules.

3. The client system of claim 1, wherein the at least one hardware processor is configured to determine the combined set of monitoring rules according to an intersection of the first and second sets of monitoring rules.

4. The client system of claim 1, wherein a selected rule of the first set of monitoring rules includes a selected heuristic employed to determine whether the target process is malicious.

5. The client system of claim 1, wherein a selected rule of the first set of monitoring rules instructs the anti-malware engine to determine whether the target process performs a selected action.

6. The client system of claim 1, wherein the another instance of the main executable module executes on a second client system of the plurality of client systems.

7. The client system of claim 1, wherein the at least one hardware processor is further configured, in response to configuring the anti-malware engine, to:
detect an action performed by the target process, the action comprising loading another executable module into the target process, the another executable module distinct from the main executable module and the shared library;
in response to detecting the action, re-evaluate the target process to determine whether the target process is likely to be malicious according to a third module reputation indicator of the another executable module, the third module reputation indicator received from the server; and
in response, re-configure the anti-malware engine according to a third set of monitoring rules indicated by the third module reputation indicator.

8. The client system of claim 1, wherein determining whether the target process is likely to be malicious comprises:
identifying all executable modules loaded by the target process;
determining whether each module of the all executable modules is likely to be malicious according to a module reputation indicator determined for an instance of the each module; and
in response, when each module of the all executable modules is not likely to be malicious, determining that the target process is not likely to be malicious.

9. The client system of claim 8, wherein determining whether the target process is likely to be malicious further comprises, in response to determining whether each module is likely to be malicious, when at least one module of the all executable modules is likely to be malicious, determining that the target process is likely to be malicious.

10. The client system of claim 1, wherein the at least one hardware processor is configured, in response to configuring the anti-malware engine, to:
determine whether the target process performs a malware-indicative action; and
when the target process performs the malware-indicative action,
identify a suspect module of the target process, the suspect module performing the malware-indicative action;
update a module reputation indicator of the suspect module to indicate that the suspect module is likely to be malicious; and
in response to updating the module reputation indicator of the suspect module,
re-configure the anti-malware engine to monitor the target process according to a strict security protocol, wherein the strict security protocol is more computationally expensive than the combined set of monitoring rules.

11. The client system of claim 10, wherein the at least one hardware processor is further configured, in response to updating the module reputation indicator of the suspect module, to transmit the updated module reputation indicator of the suspect module to the server.

12. The client system of claim 10, wherein the at least one hardware processor is further configured, in response to updating the module reputation indicator of the suspect module, to:
identify a second process executing on the client system, the second process comprising an instance of the suspect module; and
in response to identifying the second process, configure the anti-malware engine to monitor the second process according to the strict security protocol.

13. The client system of claim 1, wherein the at least one hardware processor is further configured, in response to configuring the anti-malware engine to:
determine whether the target process performs a malware-indicative action; and
when the target process performs the malware-indicative action, configure the anti-malware engine to employ a strict security protocol to monitor a second process executing on the client system, regardless of whether the second process is likely to be malicious.

14. A server comprising:
a memory, and
at least one hardware processor connected to the memory and configured to:
determine a first module reputation indicator of a main executable module and a second module reputation indicator of a shared library, the first module reputation indicator determined according to a behavior of an instance of the main executable module, wherein the first module reputation indicator comprises an indicator of a first set of monitoring rules, and wherein the second module reputation indicator comprises a second set of monitoring rules; and
in response to determining the first and second module reputation indicators, transmit the first and second module reputation indicators to a client system of a plurality of client systems configured to perform anti-malware transactions with the server,
wherein the client system is configured to execute an anti-malware engine configured to monitor a target process for malicious activity, wherein the target process comprises another instance of the main executable module and an instance of the shared library, and wherein the client system is further configured to:
determine whether the target process is likely to be malicious according to the first and second module reputation indicators;
in response to determining whether the target process is likely to be malicious, when the target process is not likely to be malicious,
combine the first and second sets of monitoring rules into a combined set of monitoring rules, and
configure the anti-malware engine to monitor the target process according to the combined set of monitoring rules.

15. The server of claim 14, wherein the client system is configured to determine the combined set of monitoring rules according to a union of the first and second sets of monitoring rules.

16. The server of claim 14, wherein the client system is configured to determine the combined set of monitoring rules according to an intersection of the first and second sets of monitoring rules.

17. The server of claim 14, wherein a selected rule of the first set of monitoring rules includes a selected heuristic employed to determine whether the target process is malicious.

18. The server of claim 14, wherein a selected rule of the first set of monitoring rules instructs the client system to determine whether the target process performs a selected action.

19. The server of claim 14, wherein the instance of the main executable module executes on a second client system of the plurality of client systems.

20. The server of claim 14, wherein the client system is further configured, in response to configuring the anti-malware engine, to:
detect an action of the target process, the action comprising loading another executable module into the target process, the another executable module distinct from the main executable module and the shared library;
in response to detecting the action, re-evaluate the target process to determine whether the target process is likely to be malicious according to a third module reputation indicator of the another executable module, the third module reputation indicator received from the server; and
in response, re-configure the anti-malware engine according to a third set of monitoring rules indicated by the third module reputation indicator.

21. The server of claim 14, wherein determining whether the target process is likely to be malicious comprises:
identifying all executable modules loaded by the target process;
determining whether each module of the all executable modules is likely to be malicious according to a module reputation indicator determined for an instance of the each module; and
in response, when each module of the all executable modules is not likely to be malicious, determining that the target process is not likely to be malicious.

22. The server of claim 21, wherein determining whether the target process is likely to be malicious further comprises, in response to determining whether each module is likely to be malicious, when at least one module of the all executable modules is likely to be malicious, determining that the target process is likely to be malicious.

23. The server of claim 14, wherein the client system is further configured, in response to configuring the anti-malware engine, to:
determine whether the target process performs a malware-indicative action; and
when the target process performs the malware-indicative action,
identify a suspect module of the target process, the suspect module performing the malware-indicative action;
update a module reputation indicator of the suspect module to indicate that the suspect module is likely to be malicious; and
in response to updating the module reputation indicator of the suspect module,
re-configure the anti-malware engine to monitor the target process according to a strict security protocol, wherein the strict security protocol is more computationally expensive than the combined set of monitoring rules.

24. The server of claim 23, further configured to receive the updated module reputation indicator of the suspect module from the client system.

25. The server of claim 23, wherein the client system is further configured, in response to updating the module reputation indicator of the suspect module, to:
- identify a second process executing on the client system, the second process comprising an instance of the suspect module; and
- in response to identifying the second process, configure the anti-malware engine to monitor the second process according to the strict security protocol.

26. The server of claim 14, wherein the client system is further configured, in response to configuring the anti-malware engine, to:
- determine whether the target process performs a malware-indicative action; and
- when the target process performs the malware-indicative action, configure the anti-malware engine to employ a strict security protocol to monitor a second process executing on the client system, regardless of whether the second process is likely to be malicious.

27. A non-transitory computer readable medium storing instructions which, when executed, configure at least one processor of a client system executing a target process, the target process comprising an instance of a main executable module and an instance of a shared library, to:
- receive from a server a first module reputation indicator of the main executable module and a second module reputation indicator of the shared library, the first module reputation indicator determined according to a behavior of another instance of the main executable module, wherein the server is configured to perform anti-malware transactions with a plurality of client systems including the client system, wherein the first module reputation indicator comprises an indicator of a first set of monitoring rules, and wherein the second module reputation indicator comprises an indicator of a second set of monitoring rules;
- in response to receiving the first and second module reputation indicators, determine whether the target process is likely to be malicious according to the first and second module reputation indicators; and
- in response to determining whether the target process is likely to be malicious, when the target process is not likely to be malicious,
  - combine the first and second sets of monitoring rules into a combined set of monitoring rules, and
  - configure the anti-malware engine to monitor the target process according to the combined set of monitoring rules.

28. The client system of claim 1, wherein the at least one hardware processor is further configured, in response to determining whether the target process is likely to be malicious, when the target process is likely to be malicious, to configure the anti-malware engine to monitor the target process according to a strict security protocol, wherein the strict security protocol is more computationally expensive than the combined set of monitoring rules.

29. The server of claim 14, wherein the client system is further configured, in response to determining whether the target process is likely to be malicious, when the target process is likely to be malicious, to configure the anti-malware engine to monitor the target process according to a strict security protocol, wherein the strict security protocol is more computationally expensive than the combined set of monitoring rules.

* * * * *